(12) United States Patent
Caiafa et al.

(10) Patent No.: US 9,438,120 B2
(45) Date of Patent: Sep. 6, 2016

(54) SYSTEMS AND METHODS FOR FAST KILOVOLT SWITCHING IN AN X-RAY SYSTEM

(71) Applicant: General Electric Company, Schenectady, NY (US)

(72) Inventors: Antonio Caiafa, Albany, NY (US); Philippe Ernest, Gif sur Yvette (FR); Dominique Poincloux, Paris (FR)

(73) Assignee: General Electric Company, Niskayuna, NY (US)

( * ) Notice: Subject to any disclaimer, the term of this patent is extended or adjusted under 35 U.S.C. 154(b) by 305 days.

(21) Appl. No.: 14/160,919

(22) Filed: Jan. 22, 2014

(65) Prior Publication Data

US 2015/0207415 A1 Jul. 23, 2015

(51) Int. Cl.
*H02M 3/335* (2006.01)
*H02M 7/10* (2006.01)
*H02M 7/48* (2007.01)
*H05G 1/58* (2006.01)

(52) U.S. Cl.
CPC .......... *H02M 3/33507* (2013.01); *H02M 7/10* (2013.01); *H02M 7/4807* (2013.01); *H05G 1/58* (2013.01); *H02M 2007/4815* (2013.01); *Y02B 70/1441* (2013.01)

(58) Field of Classification Search
CPC ......... H02M 3/33507; H02M 7/4807; H02M 2007/4815
See application file for complete search history.

(56) References Cited

U.S. PATENT DOCUMENTS

| 4,504,895 A * | 3/1985 | Steigerwald ........ H02M 3/3376 363/132 |
| 5,661,774 A | 8/1997 | Gordon et al. |
| 7,529,344 B2 | 5/2009 | Oreper |
| 7,792,241 B2 | 9/2010 | Wu et al. |

(Continued)

OTHER PUBLICATIONS

Zou et al., "Analysis of Fast kV-Switching in Dual Energy CT using a Prereconstruction Decomposition Technique", Medical Imaging 2008 Physics of Medical Imaging Proc. of SPIE, pp. 1-12, vol. 6913, Mar. 18, 2008.

(Continued)

*Primary Examiner* — Jessica Han
(74) *Attorney, Agent, or Firm* — Melissa K. Dobson

(57) ABSTRACT

A system includes a two-channel inverter for receiving a non-zero variable input voltage, first and second input channels each electrically coupled to the two-channel inverter, a transformer having a primary winding in electrical communication with the first and second input channels and secondary windings, and an active resonant circuit in electrical communication with the secondary windings for generating a switching output voltage at each of two different voltage levels. The active resonant circuit includes switching devices arranged in an anti-parallel configuration, a capacitor electrically coupled in series with the switching devices for receiving and storing energy during a first portion of a resonance cycle and for discharging the energy during a second portion of the resonance cycle, an inductor electrically coupled in series with the capacitor and the switching devices for transferring the energy to and from the capacitor during the resonance cycle, and an output.

19 Claims, 19 Drawing Sheets

(56) References Cited

U.S. PATENT DOCUMENTS

| | | |
|---|---|---|
| 8,165,264 B2 | 4/2012 | Zou |
| 8,842,449 B1 * | 9/2014 | Tong ................. H02M 3/33507 363/21.02 |
| 2012/0155613 A1 | 6/2012 | Caiafa et al. |
| 2012/0155614 A1 | 6/2012 | Caiafa et al. |
| 2015/0036394 A1 * | 2/2015 | Yang ................. H02M 3/33507 363/21.18 |
| 2015/0049519 A1 * | 2/2015 | Izadian ................... H02M 1/08 363/21.02 |

OTHER PUBLICATIONS

Schoepf., "Article Series "Dual-Energy CT: What About Radiation Dose?" (1/3)—Introduction", Dual Source CT Experts Community, May 11, 2011.

Bera., "Dual-Energy CT—A Technological Marvel", Medical Buyer Medical Equipment & Devices, Sep. 6, 2011.

Zhao et al., "Dual Source, Dual Energy Computed Tomography in Pulmonary Embolism", Intechopen, pp. 1-16, 2012.

* cited by examiner

SYSTEMS AND METHODS FOR FAST KILOVOLT SWITCHING IN AN X-RAY SYSTEM

BACKGROUND

The subject matter disclosed herein relates generally to voltage switching systems, and more particularly, to methods and apparatus for voltage switching in imaging systems, such as diagnostic X-ray imaging systems.

In conventional computed tomography (CT) X-ray imaging systems, an X-ray source emits a cone-shaped X-ray beam toward a subject or object, such as a patient or piece of luggage. The beam, after being attenuated by the subject, impinges upon an array of radiation detectors. The intensity of the attenuated beam radiation received at the detector array is dependent upon the attenuation of the X-ray beam by the subject. Each detector element of the detector array produces a separate electrical signal indicative of the X-ray intensity received by that particular detector element. The electrical signals are quantized and transmitted to a data processing system for analysis, which generally results in the presentation of an image.

CT imaging systems may comprise energy-discriminating (ED), multi-energy (ME), and/or dual-energy (DE) CT imaging systems that may be referred to as an EDCT, MECT, and/or DECT imaging system. The EDCT, MECT, and/or DECT imaging systems are configured to measure energy-sensitive projection data. The energy-sensitive projection data may be acquired using multiple applied X-ray spectra by modifying the operating voltage of the X-ray tube or utilizing X-ray beam filtering techniques (e.g., energy-sensitive X-ray generation techniques), or by energy-sensitive data acquisition by the detector using energy-discriminating, or with photon counting detectors or dual-layered detectors (e.g., energy-sensitive X-ray detection techniques).

With X-ray generation techniques, various system configurations utilize modification of the operating voltage of the X-ray tube including: (1) acquisition of projection data from two sequential scans of the object using different operating voltages of the X-ray tube, (2) acquisition of projection data utilizing rapid switching of the operating voltage of the X-ray tube to acquire low-energy and high-energy information for an alternating subset of projection views, or (3) concurrent acquisition of energy-sensitive information using multiple imaging systems with different operating voltages of the X-ray tube.

EDCT/MECT/DECT provides energy discrimination capability that allows material characterization. For example, in the absence of object scatter, the system utilizes signals from two applied photon spectra, namely the low-energy and the high-energy incident X-ray spectrum. The low-energy and high-energy incident X-ray spectra are typically characterized by the mean energies of the applied X-ray beams. For example, the low-energy X-ray spectrum comprises X-ray photons with lower-energy photons, resulting in a lower mean energy, relative to the high-energy X-ray spectrum. The detected signals from low-energy and high-energy X-ray spectra, either from two different applied spectra (X-ray generation techniques) or by regions of the same applied spectrum (X-ray detection techniques) provide sufficient information to estimate the effective atomic number of the material being imaged. Typically, X-ray attenuation mechanisms (Compton scattering or Photoelectric absorption) or the energy-sensitive attenuation properties of two basis materials (typically water and calcium for patient scanning) are used to enable estimation of the effective atomic number.

Dual-energy scanning can obtain diagnostic CT images that enhance contrast separation within the image by utilizing energy-sensitive measurements. To facilitate processing of the energy-sensitive measurements, the applied X-ray spectrum should be constant during an integration period. For example, such CT systems that acquire interleaved subsets of low-energy and high-energy projection data (versus two separate scans) should operate to maintain the accelerating voltage steady during an acquisition interval. Also, the change from one voltage level to another voltage level should occur very rapidly. Less stable X-ray tube operating voltages and/or slower operating voltage switching times result in a reduction in the difference in effective mean energy (the average of the mean energy of time-varying X-ray spectrum) of the applied X-ray spectra, which reduces the fidelity of the system in characterizing different materials.

Thus, while switching the X-ray tube potential (voltage), for example, by using high-frequency generators, may solve some of the problems related to conventional dual-energy scanning (acquiring energy-sensitive projection data on alternate scans of the object), such a configuration does not always provide the switching speed needed for certain imaging applications. For example, cardiac imaging cannot be effectively performed by simply switching the X-ray source potential between two sequential scans of the human thorax due to cardiac motion. Furthermore, for systems utilizing rapid switching of the X-ray potential for subsets of projection angles, the switching speed of the X-ray tube potential may not be sufficient for the fast gantry rotation speeds required to freeze motion for cardiac imaging. There is often a delay in the response time of the switched operating potential between the high frequency generator and the X-ray tube, due in part to the capacitance of the cable connecting the device and the X-ray tube.

The delay in response time is dependent on the X-ray beam current of the X-ray tube as the beam current also either helps or hinders the discharge of the associated system capacitance. Accordingly, the rise time in switching the generator from a first (low) voltage, or low kVp, level to a second (high) voltage, or high kVp, level is limited by the power of the high-voltage generator, which may be suboptimal for dual-energy imaging in many medical applications. Similarly, the fall time between switching the high kVp to a low kVp level is generally very slow due to the need to discharge the system capacitance, which effectively reduces the energy separation of the applied spectra, resulting in reduced material characterization sensitivity and, therefore, the effectiveness of the dual-energy imaging. As such, these insufficient switching speeds often lead to projection data pair inconsistencies resulting in streak artifacts in reconstructed images. Additionally, many industrial CT systems for baggage inspection utilize stationary anode tube configurations that have an X-ray beam current that is an order of magnitude or more lower than the X-ray beam current used with medical CT system employing rotating-anode technology. As such, the time required to switch the operating voltage of the X-ray tube is prohibitively long.

For radiographic X-ray imaging systems, the limitations mentioned above also apply. Radiographic X-ray systems acquire one or more views of the imaged object, which may be presented as two-dimensional projection images, or in some cases where several more projection data are acquired, as three-dimensional images generated using tomosynthesis techniques. The aforementioned limitations regarding switching speed apply to X-ray radiographic or tomosynthesis systems such as due to the capacitance of the high-voltage cable connecting the generator to the X-ray tube, the X-ray tube capacitance itself, the power of the generator, and the X-ray beam current that may limit switching speed.

Although certain circuits may overcome these limitations, certain radiographic systems may require various hardware configurations that limit the ability to operate the voltage switching circuitry in the system from a location off the rotating gantry. Particularly, these systems may have a slip ring which may accommodate fewer connections between the gantry circuitry and off-gantry circuitry than in the conventional systems. In these hardware configurations, it may be impossible to operate the voltage switching circuitry as would be done in a more conventional configuration.

SUMMARY

According to an embodiment, a voltage switching system includes a two-channel inverter configured to receive a non-zero variable input voltage from a voltage source, a first input channel and a second input channel each electrically coupled to the two-channel inverter, a transformer having a primary winding in electrical communication with the first input channel and the second input channel, and a plurality of secondary windings, and an active resonant circuit in electrical communication with the secondary windings of the transformer and configured to generate a switching output voltage at each of two different voltage levels, each of the two different voltage levels being different than the non-zero variable input voltage. The active resonant circuit includes a plurality of switching devices arranged in an anti-parallel configuration, a capacitor electrically coupled in series with the plurality of switching devices and configured to receive and store energy during a first portion of a resonance cycle and further configured to discharge the energy during a second portion of the resonance cycle, an inductor electrically coupled in series with the capacitor and the plurality of switching devices and configured to transfer the energy to and from the capacitor during the resonance cycle, and an output configured to be electrically coupled to a load.

In some embodiments, the plurality of switching devices may be configured to recirculate the energy stored in the capacitor via the inductor during a subsequent resonance cycle. In some embodiments, the active resonant circuit may be further configured to generate one of the two different voltage levels during the first portion of the resonance cycle and another one of the two different voltage levels during the second portion of the resonance cycle.

In some embodiments, the voltage switching system may further include a resonant tank electrically interposed between the primary winding of the transformer and one of the first input channel and the second input channel. In some embodiments, the voltage switching system may further include a slip-ring electrically interposed between the transformer and the two-channel inverter. In some embodiments, the voltage switching system may further include a rectifier electrically interposed between the secondary windings of the transformer and the active resonant circuit.

In some embodiments, the transformer may be a first transformer and the active resonant circuit may be a first active resonant circuit. The voltage switching system may further include a second transformer having a primary winding electrically interposed between the primary winding of the first transformer and one of the first input channel and the second input channel, and a plurality of secondary windings, and a second active resonant circuit in electrical communication with the secondary windings of the second transformer and configured to generate a second switching output voltage at each of the two different voltage levels. The second active resonant circuit may include a second plurality of switching devices arranged in the anti-parallel configuration, a second capacitor electrically coupled in series with the second plurality of switching devices and configured to receive and store a second energy during the first portion of the resonance cycle and further configured to discharge the second energy during the second portion of the resonance cycle, a second inductor electrically coupled in series with the second capacitor and the second plurality of switching devices and configured to transfer the second energy to and from the second capacitor during the resonance cycle, and a second output electrically coupled in series with the output of the first active resonant circuit. In some embodiments, the first transformer and the second transformer may be in electrical communication with the two-channel inverter via at most two channels.

In some embodiments, the voltage switching system may further include an x-ray tube connected to the output of the active resonant circuit and configured to provide two different energy spectra when powered by the two different voltage levels.

According to an embodiment, a method of voltage switching includes receiving a non-zero variable input voltage from a voltage source, electrically communicating the non-zero variable input voltage to a primary winding of a transformer via a first input channel and a second input channel, and switching a plurality of switching devices arranged in an anti-parallel configuration and coupled to a plurality of secondary windings of the transformer to generate a switching output voltage at each of two different voltage levels. Each of the two different voltage levels is different than the non-zero variable input voltage. The method further includes, during a first portion of a resonance cycle, receiving and storing energy in a capacitor electrically coupled in series with the plurality of switching devices; during a second portion of the resonance cycle, discharging the energy stored in the capacitor; during the resonance cycle, transferring the energy to and from the capacitor via an inductor electrically coupled in series with the capacitor and the plurality of switching devices; and outputting the switching output voltage to a load.

In some embodiments, the method may further include recirculating the energy stored in the capacitor via the inductor during a subsequent resonance cycle using the plurality of switching devices. In some embodiments, the method may further include generating one of the two different voltage levels during the first portion of the resonance cycle and generating another one of the two different voltage levels during the second portion of the resonance cycle.

In some embodiments, the method may further include electrically communicating the non-zero variable input voltage via a resonant tank interposed between the primary winding of the transformer and one of the first input channel and the second input channel. In some embodiments, the method may further include electrically communicating the non-zero variable input voltage via a slip-ring electrically interposed between the transformer and the two-channel inverter. In some embodiments, the method may further include electrically communicating a high voltage via a rectifier interposed between the secondary windings of the transformer and the active resonant circuit.

In some embodiments, the transformer may be a first transformer and the active resonant circuit may be a first active resonant circuit. The method may further include electrically communicating the non-zero variable input voltage to a primary winding of a second transformer via the first input channel and the second input channel. The second transformer may have a primary winding interposed between the primary winding of the first transformer and one of the first input channel and the second input channel. The method may further include switching a second plurality of switching devices arranged in an anti-parallel configuration and coupled to a plurality of secondary windings of the second transformer to generate a switching output voltage at each of the two different voltage levels. The method may further include, during the first portion of a resonance cycle, receiving and storing a second energy in a second capacitor electrically coupled in series with the second plurality of switching devices; during the second portion of the resonance cycle, discharging the second energy stored in the second capacitor; and during the resonance cycle, transferring the second energy to and from the second capacitor via a second inductor electrically coupled in series with the second capacitor and the second plurality of switching devices. In some embodiments, the method may further include, during a period of non-resonance, maintaining the second energy in the second capacitor.

In some embodiments, the first transformer and the second transformer may be in electrical communication with the two-channel inverter via at most two channels. In some embodiments, the method may further include electrically communicating the two different voltage levels to an x-ray tube connected to the output of the active resonant circuit and configured to provide two different energy spectra when powered by the two different voltage levels.

According to an embodiment, a method of controlling voltage switching at an X-ray tube includes sending a first control signal on a first channel and a second control signal on a second channel from a stationary circuit to a gantry circuit via a slip-ring, and subsequent to sending the first control signal and the second control signal, sending a third control signal on the first channel and a fourth control signal on the second channel from the stationary circuit to the gantry circuit via the slip-ring. The gantry circuit is located on a gantry, and the gantry circuit is in electrical communication with the stationary circuit via the first channel and the second channel. The gantry circuit includes a first transformer in electrical communication with a first circuit configured to provide resonant switching with energy recovery, and a second transformer in electrical communication with a second circuit configured to provide resonant switching with energy recovery. In some embodiments, the stationary circuit may be in electrical communication with the first transformer via the first channel and the stationary circuit may be in electrical communication with the second transformer via the second channel.

Any combination or permutation of embodiments is envisaged. Other objects and features will become apparent from the following detailed description considered in conjunction with the accompanying drawings. It is to be understood, however, that the drawings are designed as an illustration only and not as a definition of the limits of the invention.

DESCRIPTION OF EXEMPLARY EMBODIMENTS

Figure 1:
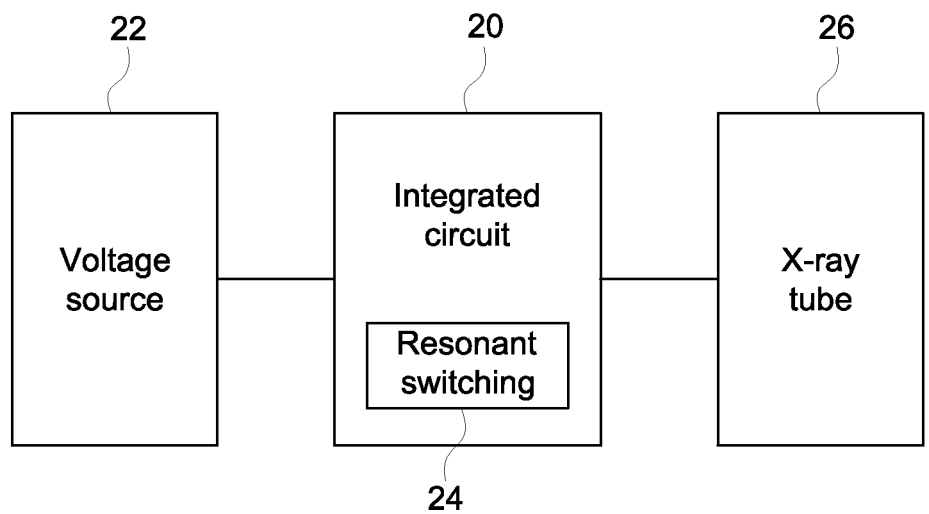
FIG. 1 is a simplified block diagram of one example of a switching architecture having an external energy recovery circuit in accordance with an embodiment.

In exemplary embodiments, an X-ray imaging system, such as a CT system, may switch between high and low voltages to emit photons having different mean frequencies from the X-ray tube. Objects having different densities (such as different organs) may be more accurately imaged by detecting photons having different mean frequencies. Portions of the circuitry controlling the high and low voltage emissions, such as an inverter, may, for example, be located on a stationary platform, while other circuitry portions may be located on a rotating gantry. A slip ring interposed between the gantry and stationary platform may facilitate electrical communication between the stationary and gantry circuit portions. While existing systems may employ three channels to communicate across the slip ring, certain slip ring designs may make it impossible or undesirable to use three channels. Accordingly, there exists a need to achieve the high voltage switching functionality originally contemplated for a three-channel system using circuitry having only two channels traversing the slip ring.

Power System Overview

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

The various embodiments are described herein within the context of a particular operating environment including a particular imaging system, such as a "third generation" computed tomography (CT) system (e.g., a sixty-four-slice CT system). It will be appreciated by one skilled in the art that embodiments of the invention are equally applicable for use with other configurations and systems, such as luggage screening systems. Furthermore, the embodiments are applicable to X-ray radiographic imaging systems as well as X-ray tomosynthesis imaging systems. Additionally, embodiments of the invention will be described with respect to the detection and conversion of X-rays. However, one skilled in the art will further appreciate that embodiments of the invention are equally applicable for the detection and conversion of other high frequency electromagnetic energy. Also, the X-ray tube and detector are described to rotate around the object being imaged, but alternate configurations wherein the detector and X-ray source are held stationary and the object is rotated are also contemplated, such as is used for industrial non-destructive testing purposes. Hence, although discussed in the context of CT systems, the various embodiments may be applied to projection X-ray imaging used in other medical and industrial radiographic applications as well.

Various embodiments provide a switching architecture including an active distributed resonant energy recovery (DRER) circuit configured to switch or assist in switching between a first voltage output level and a second voltage output level. For example, the various embodiments provide switching between a low kilovolt (kV) level, applied by a generator, to a high kV level. A stable voltage is present during the scanning integration periods of the CT system. The DRER circuit provides resonant switching with energy recovery such that the energy resulting from transition to a high kV level is stored when returning to a low kV level, then used again and recirculated when going from the low kV level to the high kV level. Additionally, the various embodiments can provide a voltage waveform with variable frequency and duty cycle, including a constant high or low voltage level. By practicing various embodiments, fast switching between the first voltage level and the second voltage level (e.g., high and low voltage levels) can be achieved. The embodiments enable improved separation in the mean energy of applied X-ray spectra, thereby improving material decomposition and effective atomic number estimation of a scanned object. Additionally, the various embodiments may be implemented in systems where the voltage to be switched is very large (e.g., 200 kV or greater), the parasitic capacitances to ground are very large, or the energy required by the load is relatively small, as is the case for industrial inspection systems utilizing stationary anode X-ray tube technology. Additionally, because of the resonant transitions, the described embodiments may reduce electromagnetic interference (EMI).

As illustrated in FIG. 1, a switching architecture in one embodiment includes a DRER circuit 20 connected to a voltage source 22 (e.g., a high voltage generator) and an X-ray tube 26. The DRER circuit 20, which can be configured as an active resonant module, includes resonant switching component(s) 24 that facilitate switching of the voltage generated from the voltage source 22 and applied to an X-ray tube 26. For example, in operation, the DRER circuit 20 with the resonant switching component 24 provides resonant switching between a high kV level (e.g., 140 kV) and a low kV level (e.g., 80 kV). However, it should be noted that other high and low voltage levels may be provided and the various embodiments are not limited to a particular voltage level. As another example, the high kV level can range from a few tens of kV (e.g., ~30 kV for mammography) to hundreds of kV (e.g., ~450 kV for industrial inspection applications). The energy is reused and recirculated when switching between the voltage levels energy, which conserves the energy and allows faster switching. In some embodiments, switching between the voltage levels can occur in about 10-100 microseconds or less.

Figure 2:
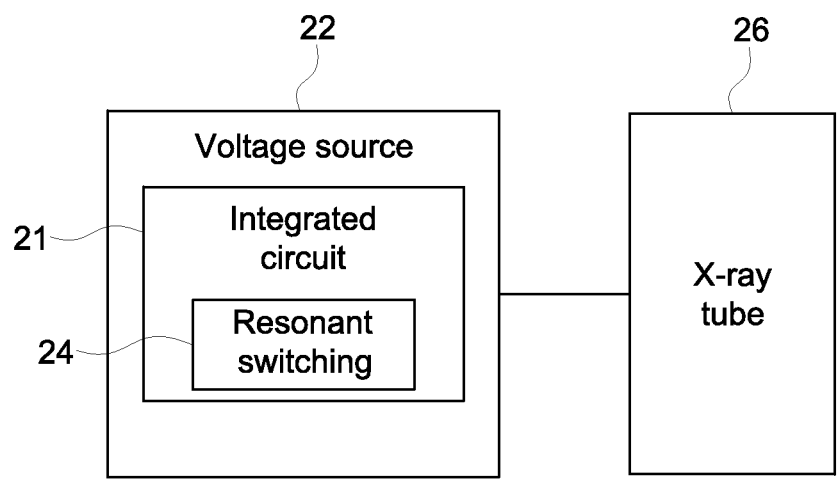
FIG. 2 is a simplified block diagram of another example of a switching architecture having an integrated Distributed Resonant Energy Recovery (DRER) circuit in accordance with an embodiment.

The embodiment illustrated in FIG. 1 includes the interposer circuit 20 connected to the voltage source 22, such as in a modular configuration. The various embodiments are not limited to such a configuration and switching architecture. For example, as illustrated in FIG. 2, the DRER circuit 20 may be integrated with or form part of the voltage source 22 and is illustrated as an integrated circuit 21 in the embodiment. In the active resonant configuration of the various embodiments, the electronics in the system can transmit power to the X-ray tube 26, for example, to charge or continue to provide power to the load (e.g., vacuum tube) at high voltage operation. For example, in the embodiment of FIG. 1, energy may be provided by the voltage source 22 at 80 kV and energy may be provided to the X-ray tube 26 at 140 kV by both the voltage source 22 and the DRER circuit 20. Different configurations of the various embodiments will now be described in more detail below.

Figure 3:
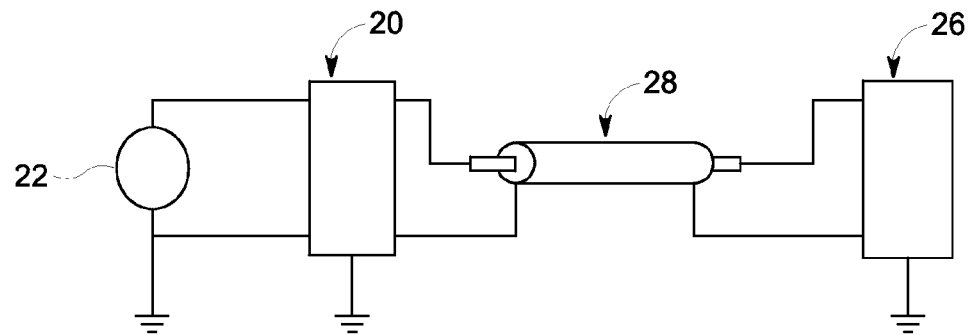
FIG. 3 is a block diagram showing one example of a connection arrangement for a DRER circuit in accordance with an embodiment.
Figure 4:
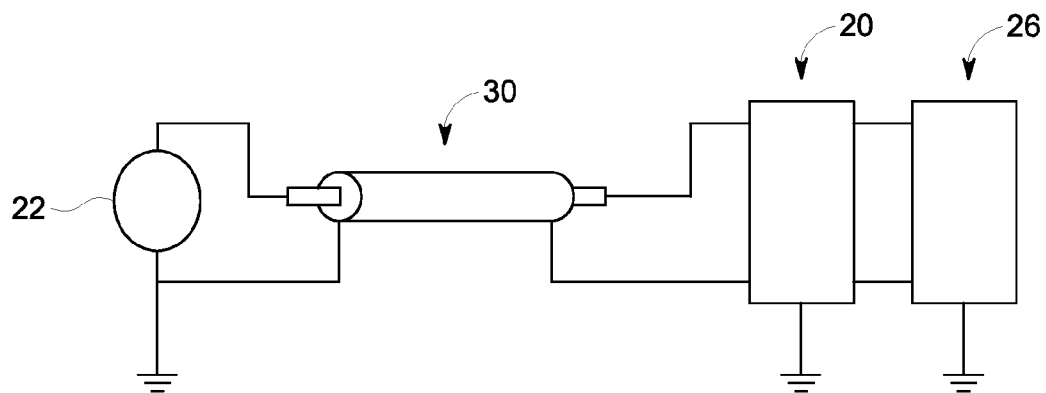
FIG. 4 is a block diagram showing another example of a connection arrangement for a DRER circuit in accordance with an embodiment.
Figure 5:
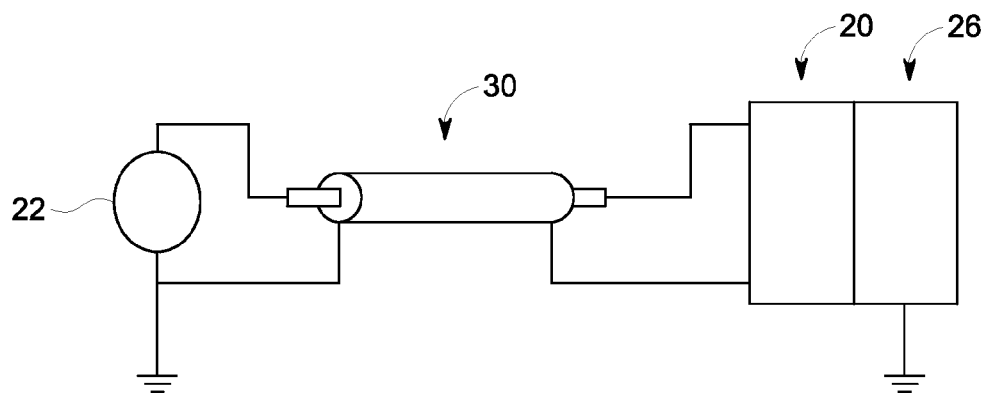
FIG. 5 is a block diagram showing yet another example of a connection arrangement for a DRER circuit in accordance with an embodiment.

As illustrated in FIGS. 3 through 5, the interposer circuit 20 can be connected in different configurations. The particular configuration selected may be based on the arrangement of the X-ray system in connection with which voltage switching is implemented. FIG. 3 illustrates an embodiment wherein the DRER circuit 20 is provided in proximity and connected to the voltage source 22 and connected to the X-ray tube 26 via a length of cable 28. It should be noted that a cable (not shown) is also provided to connect the DRER circuit 20 to the voltage source 22, which in this embodiment is shorter than the cable 28. The cable 28 connecting the DRER circuit 20 is rated for a higher voltage operation than the cable 30 illustrated in FIGS. 4 and 5. For example, the cable 28 in this embodiment is rated at the higher voltage level, such as 140 kV.

FIG. 4 illustrates an example of the DRER circuit 20 in proximity and connected to the X-ray tube 26. In this embodiment, a length of cable 30 connects the DRER circuit 20 and the voltage source 22, such that the cable 30 is rated for a lower voltage operation than the cable 28 shown in FIG. 3, for example, 80 kV. The DRER circuit 20 also may be coupled directly to the X-ray tube 26, for example, by bolting the two components together, as shown in FIG. 5. However, in all three of the embodiments illustrated in FIGS. 3 through 5, the DRER circuit 20 is a separate unit connected to the system. It should be noted that the cable 28 or 30 is generally, but not necessarily, a high-voltage cable.

The embodiments illustrated in FIGS. 3 through 5 have an active configuration, which is capable of providing energy and power at both high and low voltage levels. Accordingly, the voltage source 22 may be a high voltage generator capable of generating voltages corresponding to low levels, for example, 80 kV, and the DRER circuit 20 with the voltage source 22 provides additional energy/power to operate the load (e.g., vacuum chamber) at a high voltage level, for example, 140 kV.

Figure 6A:
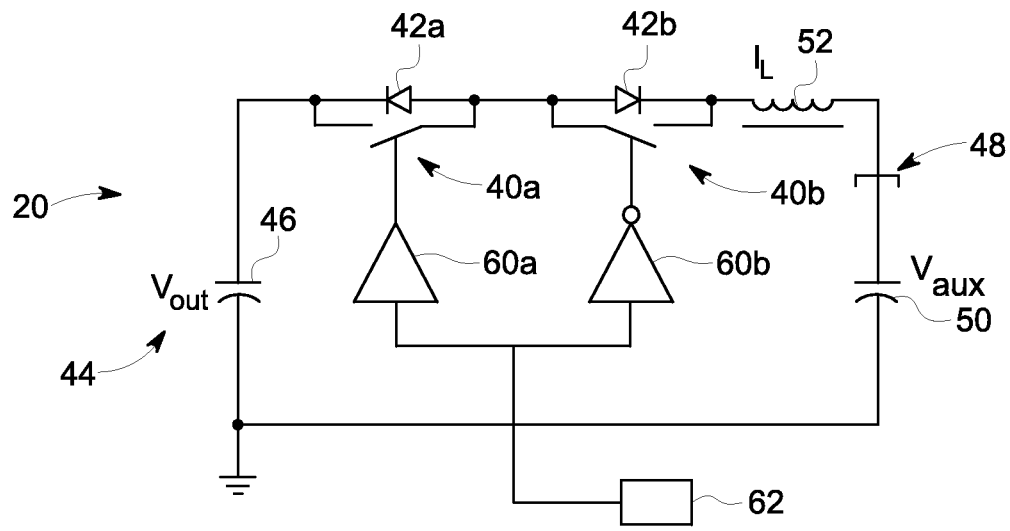
FIGS. 6A-C are simplified circuit schematic diagrams of a DRER circuit in accordance with an embodiment.
Figure 6B:
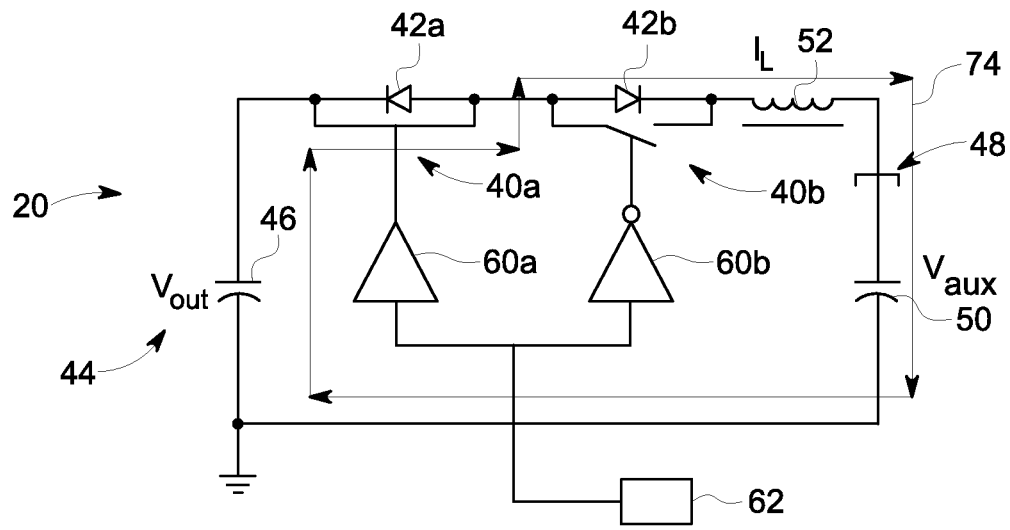
Figure 6C:
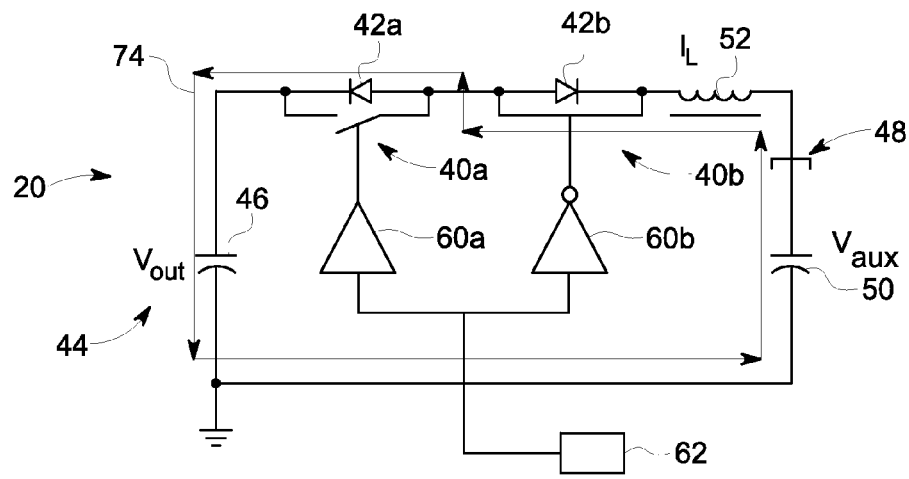

A schematic diagram of an example of one of the modules or stages 80 forming the DRER circuit 20 is shown in FIGS. 6A-C. The DRER circuit 20 operates to store energy when switching from a high voltage level to a low voltage level, and use the stored energy when transitioning to the next high voltage cycle. The DRER circuit 20 can store energy in a capacitor (e.g., capacitors 46 and/or 50) instead of through the load.

FIGS. 6B and 6C illustrate examples of the DRER circuit 20 of FIG. 6A in operation. The schematic represented in FIG. 6B includes a plurality of switching devices 40a and 40b connected in series. The switching devices 40a and 40b may be any type of switches. For example, the switching devices 40a and 40b may be metal-oxide-semiconductor field-effect transistors (MOSFETs), insulated gate bipolar transistors (IGBTs), thyristors, BJT, or any other device with a controllable turn-on feature. Such devices can be made of silicon, silicon carbide, gallium nitride, or any other material suitable for building such controllable devices. Due to the buffers 60a and 60b, the switching devices 40a and 40b are operated in opposite state with respect to one another. Accordingly, when a control signal from a driver 62 (e.g., a logic clock) is transmitted to the switching devices 40a and 40b, one of the switching devices 40a and 40b receives the opposite drive signal such that one of the switching devices 40a and 40b is in an open state and one of the switching devices 40a and 40b is in a closed state. If transitions from any kV level to a different kV level are not required the devices 40a and 40b are operated differently when operating in conventional CT mode versus a dual energy CT mode. When the voltage supply is operated in a conventional CT mode, producing only one kV level for the duration of the scan, the devices 40a and 40b may be both in a conductive state (e.g. closed) such that the auxiliary capacitance 50 is charged to the same voltage level as the system capacitance 46, thus decreasing the voltage stress on all the resonant devices 40a, 40b, 42a, 42b, and the resonant inductor 52. When the voltage supply is operated in a dual kV mode, when voltage is required to stay constant (e.g. during one view period), the devices 40a and 40b may be in a non-conductive (e.g., open) state (e.g., when the drive signal is floating). When in dual kV mode and constant voltage is required there may be two additional states that are acceptable: when the output voltage is at kV-High, the device 40b may be in a conductive state and the device 40a may be in a non-conductive state, and, when the output voltage is at kV-Low the device 40b may be in a non-conductive state and 40a in a conductive state. In various embodiments, the switching devices 40a and 40b are connected in a common source/emitter configuration to allow control by a single control line from the driver 62.

Each of the switching devices 40a and 40b is connected in an anti-parallel configuration with diodes 42a and 42b, respectively, that operate as opposing blocking diodes. The switching devices 40a and 40b are connected between a main or system capacitor 46 and an auxiliary capacitor 50. These diodes can be made of any suitable materials such as, but not limited to, silicon, silicon carbide, Galium nitride etc. An inductor 52 is also connected in series between the capacitor 50 and the diode 40b. It should be noted that the inductor 52 also might be referred to as a resonant inductor. In some embodiments there may be more than one main capacitor 46 (e.g., arranged in series) and/or more than one auxiliary capacitor 50 (e.g., arranged in series), as well as multiple inductors connected in series.

In operation, as described in more detail below, energy is resonantly transferred between two energy storage elements (e.g., capacitors 46 and 50), for example from capacitor 46 to capacitor 50, and vice versa. The switching speed of the transition between voltage levels is controlled by the inductor 52 rather than by a load, and by the capacitors 46 and 50. The inductor 52, and the capacitors 46 and 50 operate as resonant elements. In some embodiments, the values of the capacitors 46 and 50 are set by the geometrical size of, for example, the connecting cable and vacuum tube; accordingly, the switching speed from one voltage level to another, is determined by the value of the inductor 52. For example, the smaller the value of the inductor 52, the faster the transition of the switching between high to low voltage, and vice versa. The transition speed of the switching devices 40a and 40b (in opening or closing) in various embodiments is much faster than the voltage transition speed.

As an example, when the voltage across the main capacitor 46 ($V_{out}$) is a high voltage level, the switching device 40a is in a closed state and the switching device 40b is in an open state. In this high voltage state, when the switching device 40a operates as a short across diode 42a, energy transfers from the main capacitor 46 ($V_{out}$) to the auxiliary capacitor 50 ($V_{aux}$), as indicated at 74 in FIG. 6B. The transition from the high voltage state to a low voltage state, where the output voltage 44 decreases from a high voltage level to a low voltage level, is accomplished by switching the switching devices 40a and 40b. In particular, the switching device 40a switches from an open state to a closed state and the switching device 40b switches from a closed state to an open state. It should be noted that the switching of the switching devices 40a and 40b is provided in parallel based on the signal from the driver 62. The switching of the switching devices 40a and 40b causes the resonance state to start and the energy in the capacitor 46 is transferred to the capacitor 50, through the inductor 52, for storage until the next high-voltage state is desired. When high voltage is desired, a resonant energy transfer from the capacitor 50 to the capacitor 46, through resonant inductor 52, is restarted by opening the switching device 40a and closing the switching device 40b, such that the energy stored in the capacitor 50 is transferred to the capacitor 46, as indicated at 74 in FIG. 6C.

Thus, the DRER circuit 20 can actively send or transmit energy/power to the load under any voltage condition, whether high or low. Active operation can include recharging in both the high and low voltage states/levels. It will be understood that any number of DRER circuits 20 can be used in combination with each other to perform the energy transfer.

As described above, there can be specific devices states for performing different operations. When constant voltage is required for a long period of time, both devices 40a and 40b are in a conducting state. When operating in a dual kV mode, if the output voltage is at kV-Low the accepted states are devices 40a and 40b both non-conducting states or device 40a is in a conducting state and device 40b is in a non-conducting state. When operating in a dual kV mode, if the output voltage is at kV-High the accepted states are devices 40a and 40b both non-conducting states or device 40a is in a non-conducting state and device 40b is in a conducting state. During the transition kV-High to kV-Low, a valid state is device 40a in a conducting state and device 40b in a non-conducting state. During the transition kV-Low to kV-High, a valid state is device 40a in a non-conducting state and device 40b in a conducting state.

Figure 7:
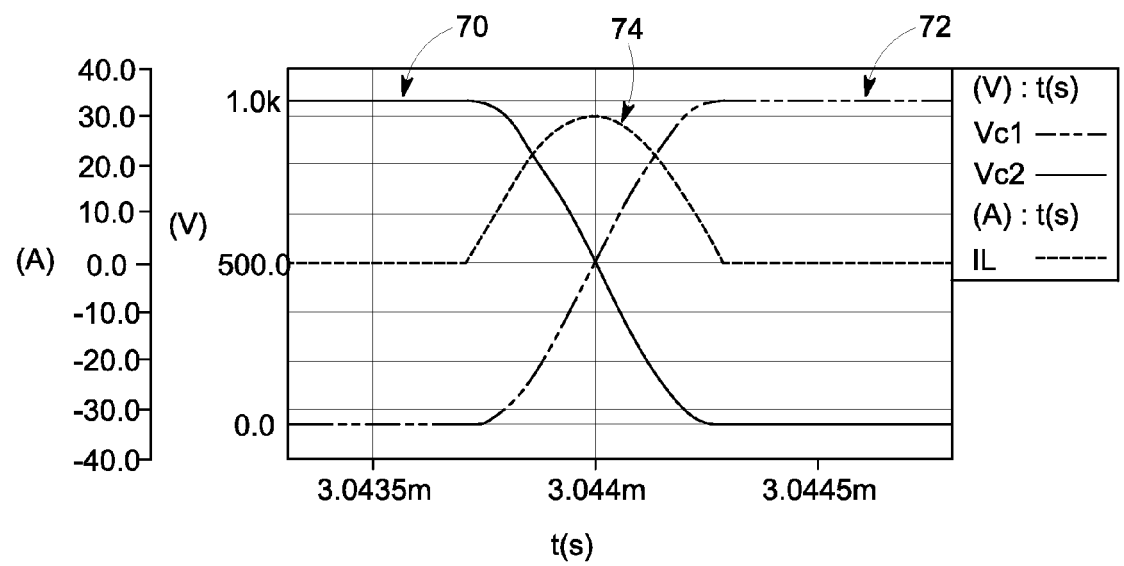
FIG. 7 is a graph of waveforms showing a low to high voltage operation of various embodiments.
Figure 8:
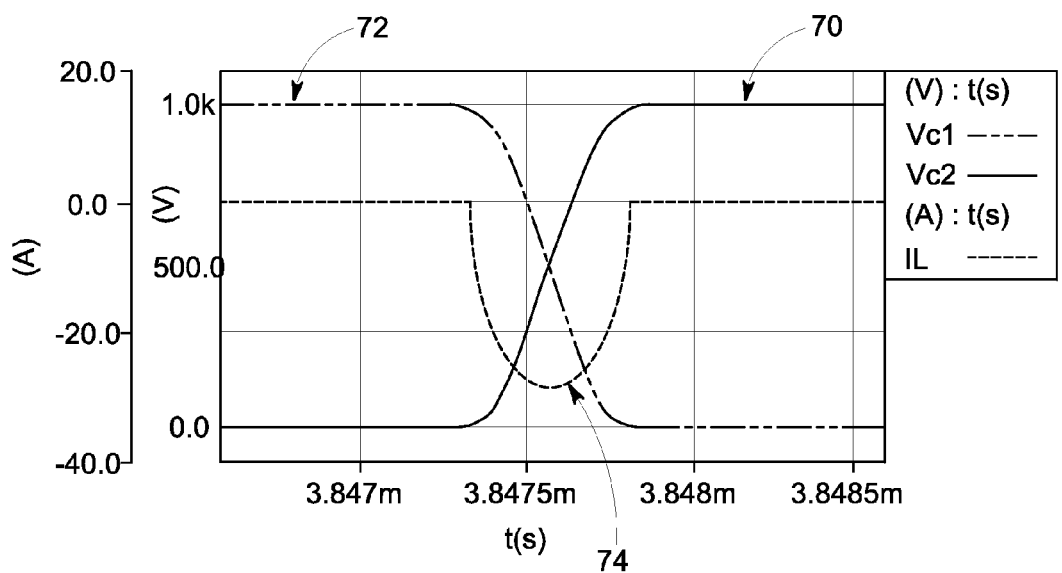
FIG. 8 is a graph of waveforms showing a high to low voltage operation of various embodiments.

FIGS. 7 and 8 are graphs illustrating waveforms of the voltage changes in the schematic circuit of FIG. 6 wherein the vertical axes represents the magnitude of the signal (e.g., voltage and current) and the horizontal axis represents time. In particular, the curve 70 represents the output voltage 44 ($V_{out}$) across capacitor 44, the curve 72 represents the auxiliary voltage 48 ($V_{aux}$) across capacitor 50 and the curve 74 represents the current ($I_L$) through the inductor 52. As demonstrated by the plots in FIG. 7, when the output voltage $V_{out}$ switches to the low voltage state, the energy is transferred from the capacitor 46 to the capacitor 50. As can be seen in FIG. 8, when the output voltage $V_{out}$ switches to the high voltage state, the energy stored in the capacitor 50 is reused and transferred back to the capacitor 46. Thus, energy used to provide a high kV is recovered when returning to the low kV. The DRER circuit 20 (FIGS. 1, 3-5) operates such that energy transfer is provided during resonance.

Figure 9:
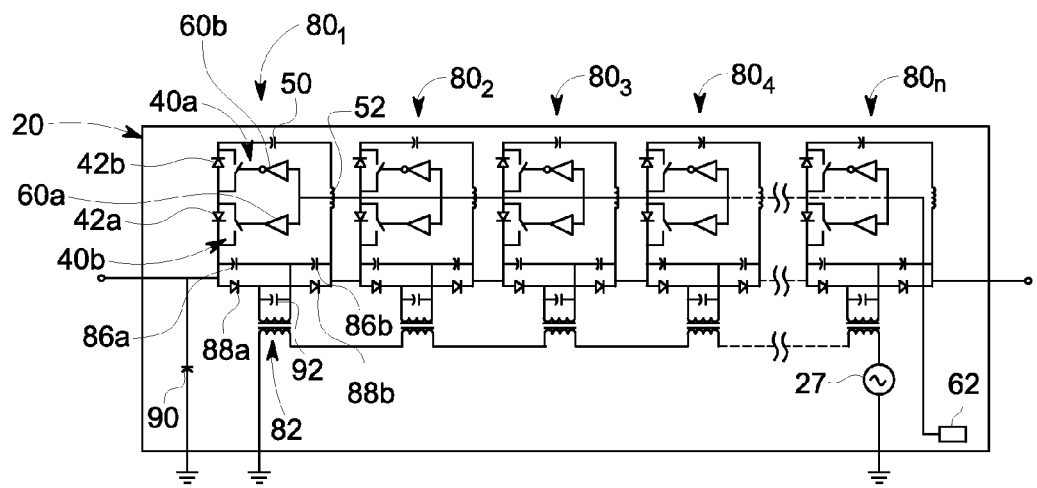
FIG. 9 is a schematic diagram of one example of the DRER circuit in accordance with an embodiment.
Figure 10:
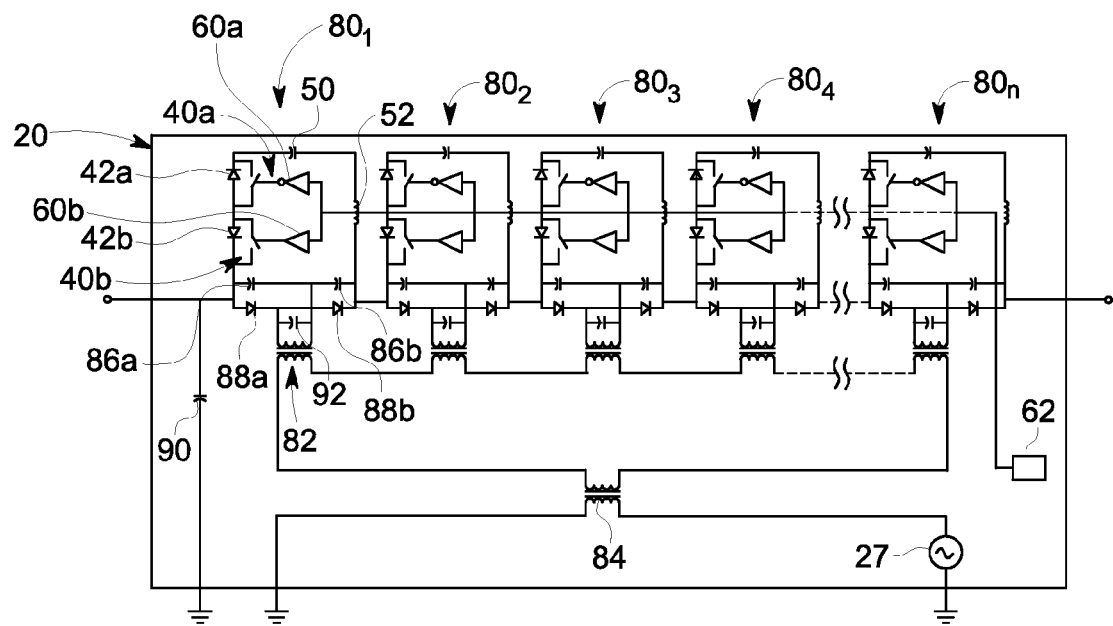
FIG. 10 is a schematic diagram of another example of the DRER circuit in accordance with an embodiment.

The DRER circuit 20 can be configured in an active mode as described herein and may include a plurality of switching stages, as well as several transformers and an additional power supply as illustrated in FIGS. 9 and 10. More particularly, a plurality of switching stages $80_1$ to $80_n$ may be provided, wherein like numeral represent like parts. It should be noted that each of the switching stages $80_1$ to $80_n$ can include similar components and for clarity only the components in one of the switching stages are identified in the figures. It should be noted that the driver 62 can drive all of the switching stages $80_1$ to $80_n$.

Figure 11:
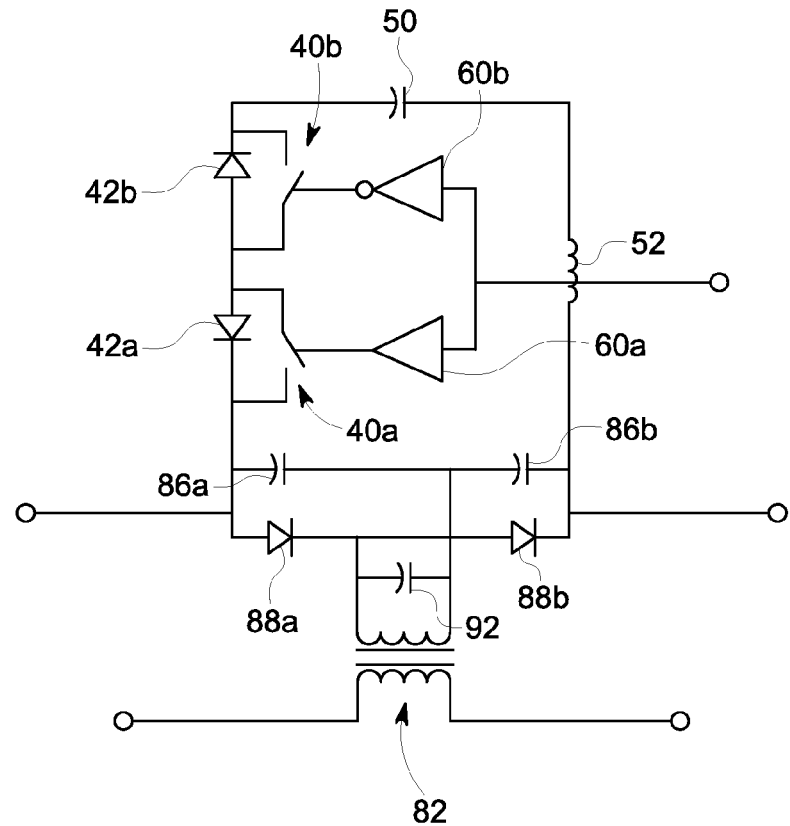
FIG. 11 is a schematic diagram of a module of the DRER circuits of FIGS. 9 and 10.

The DRER circuit 20 can be formed by a plurality of switching stages 80. FIG. 11 represents the circuit schematic of each stage shown in FIG. 9 and FIG. 10. The stage represented in FIG. 11 includes a pair of capacitors 86a and 86b connected in parallel with a pair of blocking diodes 88a and 88b, respectively. This configuration may be referred to as a voltage doubler. The series connection of the capacitors 86a and 86b represent, together with the auxiliary capacitor 50, the main resonant capacitor (equivalent to capacitor 46 in FIG. 6). The stage in FIG. 11 includes two switching devices 40a and 40b, connected in series. The switching devices 40a and 40b may be any type of switches, such as a pair of transistors. For example, the switching devices 40a and 40b may be metal-oxide-semiconductor field-effect transistors (MOSFETs) or insulated gate bipolar transistors (IGBTs). Two diodes 42a and 42b are connected in parallel to the switching devices 40a and 40b. Finally, the stage in FIG. 11 includes a resonant inductor 52, and an auxiliary capacitance 50. This stage operates as previously described herein. In particular, the capacitor 50 (the auxiliary capacitor) operates to receive the energy from the discharging capacitors 86a and 86b, and keeps or stores the energy while the system is in the low voltage state, such that the energy may be used in the transition to the high voltage state to recharge the capacitors 86a and 86b, as described in more detail herein, using the switching operation of the switching devices 40a and 40b. Thus, through the resonance cycle, the energy stored in the capacitor 50 is transferred back to the capacitors 86a and 86b when the system is in high voltage state. The capacitors 86a and 86b are maintained at a desired or required voltage by the secondary windings of the transformer 82.

The stage shown in FIG. 11 includes one rectifier circuit known as a doubler. The doubler includes the secondary transformer 82, the diodes 88a and 88b, and the capacitors 86a and 86b. It should be noted that this rectifier can be replaced by a common full bridge rectifier, where the two capacitances 86a and 86b are replaced by two diodes. Additionally the stage represented in FIG. 11 may include a transformer 82 with multiple secondary windings and a rectifying circuit connected to the secondary windings. All these rectifying circuits are connected in series and to one resonant circuit per transformer 82. For example, the stage may have a transformer 82 with three secondary windings, three rectifying circuits connected in series and one resonant circuit connected across all three rectifying circuits. Additionally, the voltage doubler, can be replaced by any voltage multiplier that is capable to produce continuous voltage.

The configuration of FIGS. 9 and 10 each include a transformer 82 connected to each of the switching stages $80_{11}$ to $80_n$. In FIGS. 9 and 10, the voltage source 22 is not shown. The voltage source 22 (shown in FIG. 1) can be connected in parallel with the input capacitance 90. The additional energy and power necessary to sustain the high voltage during operation is provided through the transformers 82. FIGS. 9 and 10 show two different configurations to connect the transformers 82 to the additional power supply.

In particular, FIG. 9 shows an embodiment where the transformers 82 are connected in series and to the voltage supply 27. In this configuration, the power is transmitted directly from the voltage source 27 to the secondary windings of the transformers 82. FIG. 10 shows another embodiment of the DRER circuit 20. According to this embodiment, the power supply 27 is connected to the transformers 82 by means of the transformer 84. This configuration is useful to decrease the isolation stress across the primary windings of the transformers 82.

In operation, when a high voltage output is desired, the transformer 82 operates to charge, and maintain a charge on, the pair of series connected capacitors 86a and 86b through the diodes 88a and 88b. It should be noted that the capacitors 86a and 86b cannot be discharged through the diodes 88a and 88b. The DRER configuration operates such that in a lower voltage state, a capacitor 90 (shown in FIGS. 9 and 10) is charged at a low voltage level, for example, 70 kV. In this low voltage level, the capacitors 86a and 86b are not charged. When at the high voltage level, the capacitors 86a and 86b are charged, for example, to 70 kV, such that the total output voltage is 140 kV. The series connected capacitors 86a and 86b are discharged to 0 kV, to transition the output voltage back to 70 kV, through a resonant cycle and the energy is transferred to the capacitor 50. The capacitor 50 (the auxiliary capacitor) operates to receive the energy from the discharging capacitors 86a and 86b, and stores the energy in the low voltage state, such that the energy may be used in the transition to the high voltage state to recharge the capacitors 86a and 86b in a very fast fashion, as described in more detail herein using the switching operation of the switching devices 40a and 40b. Thus, through the resonance cycle, the energy stored in the capacitor 50 is transferred back to the capacitors 86a and 86b. It should be noted that a capacitor 92 is also connected in parallel with each of the transformers 82, which operates as a smoothing capacitor. It will be noted that during the low kV period the power supply 27 is kept off and does not supply any energy, while during the high kV period the power supply is on and provides the necessary power to keep the high kV level constant. The power supply 27 is turned off before the transition from high kV to low kV and is turned back on after the transition from low kV to high kV.

Thus, the configurations shown in FIGS. 9 and 10 can be implemented in an existing system and provide efficient and fast switching between two voltages. For example, these embodiments may be added to a high voltage source, such as in a CT imaging system, a radiographic X-ray system, or a tomosynthesis X-ray system. The add-on configurations may be connected between the voltage source and the vacuum tube. In other embodiments of an active configuration, the switching circuitry is integrated within the system, for example, integrated as part of the voltage source.

Computed Tomography Scanner Overview

Figure 12A:
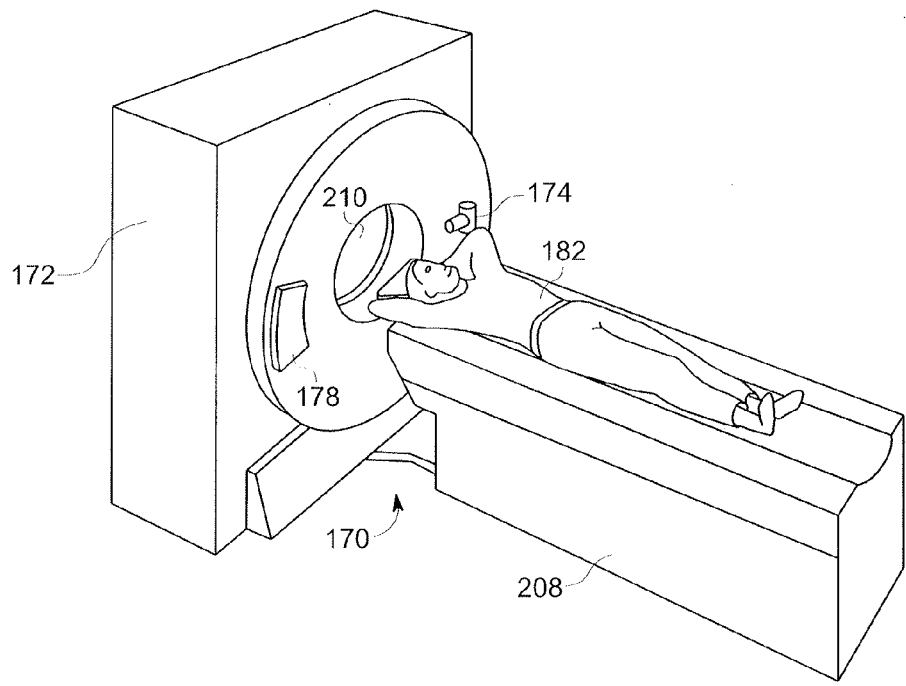
FIG. 12A is a pictorial view of a computed tomography (CT) imaging system in connection with which various embodiments may be implemented.
Figure 12B:
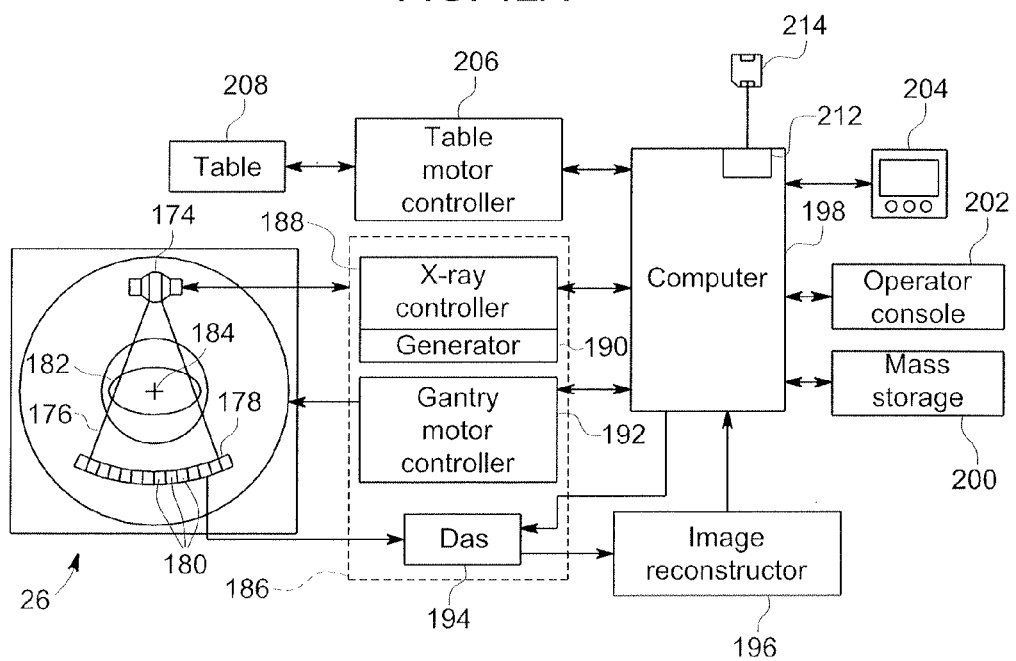
FIG. 12B is a block schematic diagram of the CT imaging system of FIG. 12A.

FIG. 12A is a pictorial view of a CT imaging system 170. FIG. 12B is a block schematic diagram of the system 170 illustrated in FIG. 12A. In the exemplary embodiment, the CT imaging system 170 is shown as including a gantry 172 representative of a "third generation" CT imaging system. The gantry 172 has an X-ray source 174 that projects a cone beam 176 of X-rays toward a detector array 178 on the opposite side of gantry 172.

The detector array 178 may be formed by a plurality of detector rows (not shown) including a plurality of detector elements 180 that together sense the projected X-ray beams that pass through an object, such as a medical patient 182 or piece of luggage. Each detector element 180 may produce an electrical signal that represents the intensity of an impinging X-ray radiation beam and hence is indicative of the attenuation of the beam as it passes through object or patient 182. The intensity may correspond to the number of incident photons at the element. An imaging system 170 having a multislice detector 178 may be capable of providing a plurality of images representative of a volume of object 182. Each image of the plurality of images corresponds to a separate "slice" of the volume. The "thickness" or aperture of the slice is dependent upon the height of the detector rows.

During a scan to acquire X-ray projection data, a rotating section within the gantry 172 and the components mounted thereon rotate about a center of rotation 184. FIG. 12B shows only a single row of detector elements 180 (i.e., a detector row). However, the multislice detector array 178 may include a plurality of parallel detector rows of detector elements 180 such that projection data corresponding to cone-beam geometry can be acquired simultaneously during a scan.

Rotation of components within the gantry 172 and the operation of radiation source 174 may be governed by a control mechanism 186. The control mechanism 186 includes an X-ray controller 188 and generator 190 that provides power and timing signals to the X-ray source 174 and a gantry motor controller 192 that controls the rotational speed and position of rotating portion of gantry 172. A data acquisition system (DAS) 194 in the control mechanism 186 samples analog data from detector elements 180 and converts the data to digital signals for subsequent processing. An image reconstructor 196 receives sampled and digitized measurement data from the DAS 194 and performs high-speed image reconstruction. The reconstructed image is applied as an input to a computer 198 that stores the image in a mass storage device 200. Although shown as a separate device, image reconstructor 196 may be special hardware located inside computer 198 or software executing within computer 198.

The computer 198 also receives commands and scanning parameters from an operator via a console 202 that has a keyboard and/or other user input device(s). An associated display system 204 allows the operator to observe the reconstructed image and other data from the computer 198. The operator supplied commands and parameters may be used by the computer 198 to provide control signals and information to the DAS 194, X-ray controller 188, generator 190 and gantry motor controller 192. In addition, the computer 198 operates a table motor controller 206 that controls a motorized table 208 to position the patient 182 in the gantry 172. The table 208 moves portions of the patient 182 through a gantry opening 210.

In one embodiment, the computer 198 includes a device 212, for example, a floppy disk drive, CD-ROM drive, DVD-ROM drive, or a solid state hard drive for reading instructions and/or data from a computer-readable medium 214, such as a floppy disk, CD-ROM, or DVD. It should be understood that other types of suitable computer-readable memory are recognized to exist (e.g., CD-RW and flash memory, to name just two), and that this description is not intended to exclude any of these. In another embodiment, the computer 198 executes instructions stored in firmware (not shown). Generally, a processor in at least one of the DAS 194, reconstructor 196, and computer 198 shown in FIG. 12B may be programmed to execute control commands to perform switching as described in more detail herein. The switching is not limited to practice in the CT system 170 and can be utilized in connection with many other types and variations of imaging systems. In one embodiment, the computer 198 is programmed to perform different functions to switch the switching devices described herein, accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits.

Figure 13:
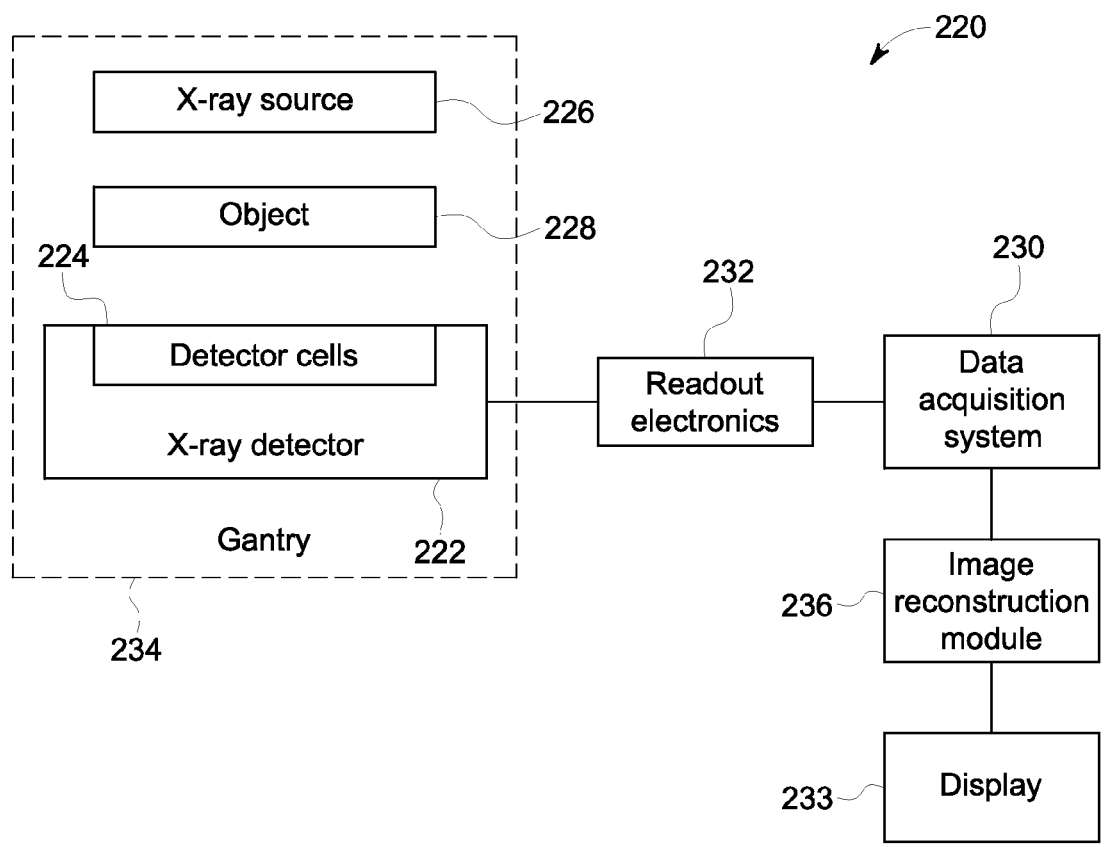
FIG. 13 is a schematic block diagram of an X-ray imaging system in connection with which various embodiments may be implemented.

FIG. 13 illustrates an X-ray imaging system 220 in which various embodiments may be implemented. The imaging system 220 generally includes an X-ray detector 222 having an array of detector cells 224 defining a scan area, and an X-ray source 226. Detector cells 224 may be the same as the elements 180 of the CT scanner of FIG. 12B in some embodiments. An object 228, such as a patient, is positioned between the X-ray source 226 and the X-ray detector 222, which may be one or more detectors or detector modules. However, the imaging system 220 may also scan other objects, such as in an industrial inspection application. The imaging system 220 also includes a data acquisition system 230 with readout electronics 232. Although shown separately in FIG. 13, the readout electronics 232 may reside within the X-ray detector 222 or the data acquisition system 230.

In one embodiment, the X-ray detector(s) 222 may be flat-panel detector systems such as an amorphous silicon flat panel detector or other type of digital X-ray image detector, such as a direct conversion detector as known to those skilled in the art. In another embodiment, the X-ray detector(s) 222 may include a scintillator having a screen that is positioned in front of the X-ray detector(s) 222.

It should be noted that the imaging system 220 may be implemented as a non-mobile or mobile imaging system. Moreover, the imaging system 220 may be provided in different configurations. For example, the image data may be generated with the X-ray source 226 positioned at discrete foci along an arc above the object to generate the image information using computed tomosynthesis procedures and processes (or may be in a radiographic configuration). In other embodiments, the X-ray source 226 and the X-ray detector 222 are both mounted at opposite ends of a gantry 234, which may be a C-arm that rotates about the object 228. The rotatable C-arm is a support structure that allows rotating the X-ray source 226 and the X-ray detector 222 around the object 228 along a substantially circular arc, to acquire a plurality of projection images of the object 228 at different angles (e.g., different views or projections) that are typically less than 360 degrees, but may comprise a full rotation in some circumstances.

In operation, the object 228 is positioned in the imaging system 220 for performing an imaging scan. For example, the X-ray source 226 may be positioned above, below or around the object 228. For example, the X-ray source 226 (and the X-ray detector(s) 222) may be moved between different positions around the object 228 using the gantry 234. X-rays are transmitted from the X-ray source 226 through the object 228 to the X-ray detector(s) 222, which detect X-rays impinging thereon.

The readout electronics 232 may include a reference and regulation board (RRB) or other data collection unit. The RRB may accommodate and connect data modules to transfer data (e.g., a plurality of views or projections) from the X-ray detector(s) 222 to the data acquisition system 230. Thus, the readout electronics 232 transmit the data from the X-ray detector(s) 222 to the data acquisition system 230. The data acquisition system 230 forms an image from the data and may store, display (e.g., on the display 233), and/or transmit the image. For example, the various embodiments may include an image reconstruction module 236, which may be implemented in hardware, software, or a combination thereof, that allows the data acquisition system to reconstruct images using X-ray data (e.g., radiographic or tomosynthesis data) acquired from the X-ray detector(s) 222 and as described in more detail herein.

Computed Tomography Scanner Overview—Computing Device

Figure 14:
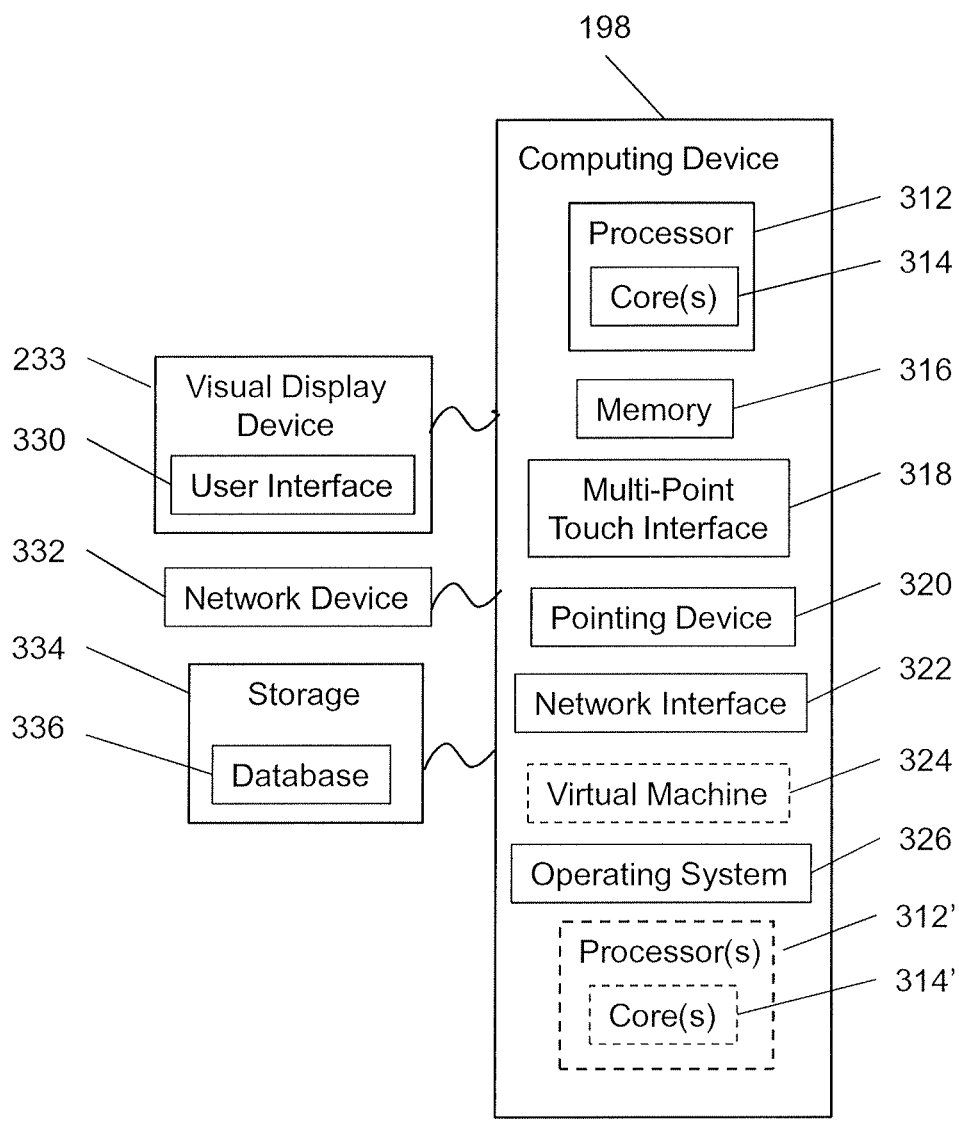
FIG. 14 is an exemplary computing device which may be programmed and/or configured to operate, for example, the system of FIGS. 12A,B and may also be used to implement certain processes described in relation to various embodiments of the present disclosure.

In some embodiments computer 198 may control the operation of the system 170 and may implement various aspects of the disclosed embodiments. FIG. 14 is a block diagram of an exemplary computing device 198 such as may be used in certain embodiments. The computing device 198 may include one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 316 included in the computing device 198 may store computer-readable and computer-executable instructions or software for interfacing with and/or controlling an operation of the scanner system 170. The computing device 198 may also include configurable and/or programmable processor 312 and associated core 314, and optionally, one or more additional configurable and/or programmable processing devices, e.g., processor(s) 312' and associated core(s) 314' (for example, in the case of computer systems having multiple processors/cores), for executing computer-readable and computer-executable instructions or software stored in the memory 316 and other programs for controlling system hardware. Processor 312 and processor(s) 312' may each be a single core processor or multiple core (314 and 314') processor.

Virtualization may be employed in the computing device 198 so that infrastructure and resources in the computing device may be shared dynamically. A virtual machine 324 may be provided to handle a process running on multiple processors so that the process appears to be using only one computing resource rather than multiple computing resources. Multiple virtual machines may also be used with one processor.

Memory 316 may include a computer system memory or random access memory, such as DRAM, SRAM, EDO RAM, and the like. Memory 316 may include other types of memory as well, or combinations thereof.

A user may interact with the computing device 198 through a visual display device 333, such as a computer monitor, which may display one or more user interfaces 330 that may be provided in accordance with exemplary embodiments. Visual display device 333 may be the same as display system 204 and/or 233 in some embodiments. The computing device 198 may include other I/O devices for receiving input from a user, for example, a keyboard or any suitable multi-point touch interface 318, a pointing device 320 (e.g., a mouse). The interface 318 such as a keyboard and the pointing device 320 may be coupled to the visual display device 333. The computing device 198 may include other suitable conventional I/O peripherals.

The computing device 198 may also include one or more storage devices 334, such as a hard-drive, CD-ROM, or other computer readable media, for storing data and computer-readable instructions and/or software that interface with and/or control an operation of the scanner system 170 described herein and/or to implement exemplary processes and methods described herein. Exemplary storage device 334 may also store one or more databases for storing any suitable information required to implement exemplary embodiments. For example, exemplary storage device 334 can store one or more databases 336 for storing information, such as scan sequences, X-ray data, X-ray images, photon counts, estimation of electrical properties, electrical property maps, and/or any other information that can be used to implement exemplary embodiments of the present disclosure. The databases may be updated manually or automatically at any suitable time to add, delete, and/or update one or more items in the databases.

The computing device 198 can include a network interface 322 configured to interface via one or more network devices 332 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 322 may include a built-in network adapter, network interface card, PCMCIA network card, card bus network adapter, wireless network adapter, USB network adapter, modem or any other device suitable for interfacing the computing device 198 to any type of network capable of communication and performing the operations described herein. Moreover, the computing device 198 may be any computer system, such as a workstation, desktop computer, server, laptop, handheld computer, tablet computer, or other form of computing or telecommunications device that is capable of communication and that has sufficient processor power and memory capacity to perform the operations described herein.

The computing device 198 may run any operating system 326, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 326 may be run in native mode or emulated mode. In an exemplary embodiment, the operating system 326 may be run on one or more cloud machine instances.

In exemplary embodiments, the CT system 170 can be configured and/or programmed to transmit instructions, commands, and/or requests to the computing device 198 to control the CT-scan components to perform scan sequences and can be programmed and/or configured to receive CT-scan data or CT-scan images from the computing device 198. Although a variety of elements of the computing device 198 have been described, one will recognize that fewer or more than all these components are needed to operate CT system 170. Accordingly, firmware and hardware modules may also be considered computing devices by the present disclosure implementing various of the described functionality.

Three-Channel Configuration—Configuration

Figure 15:
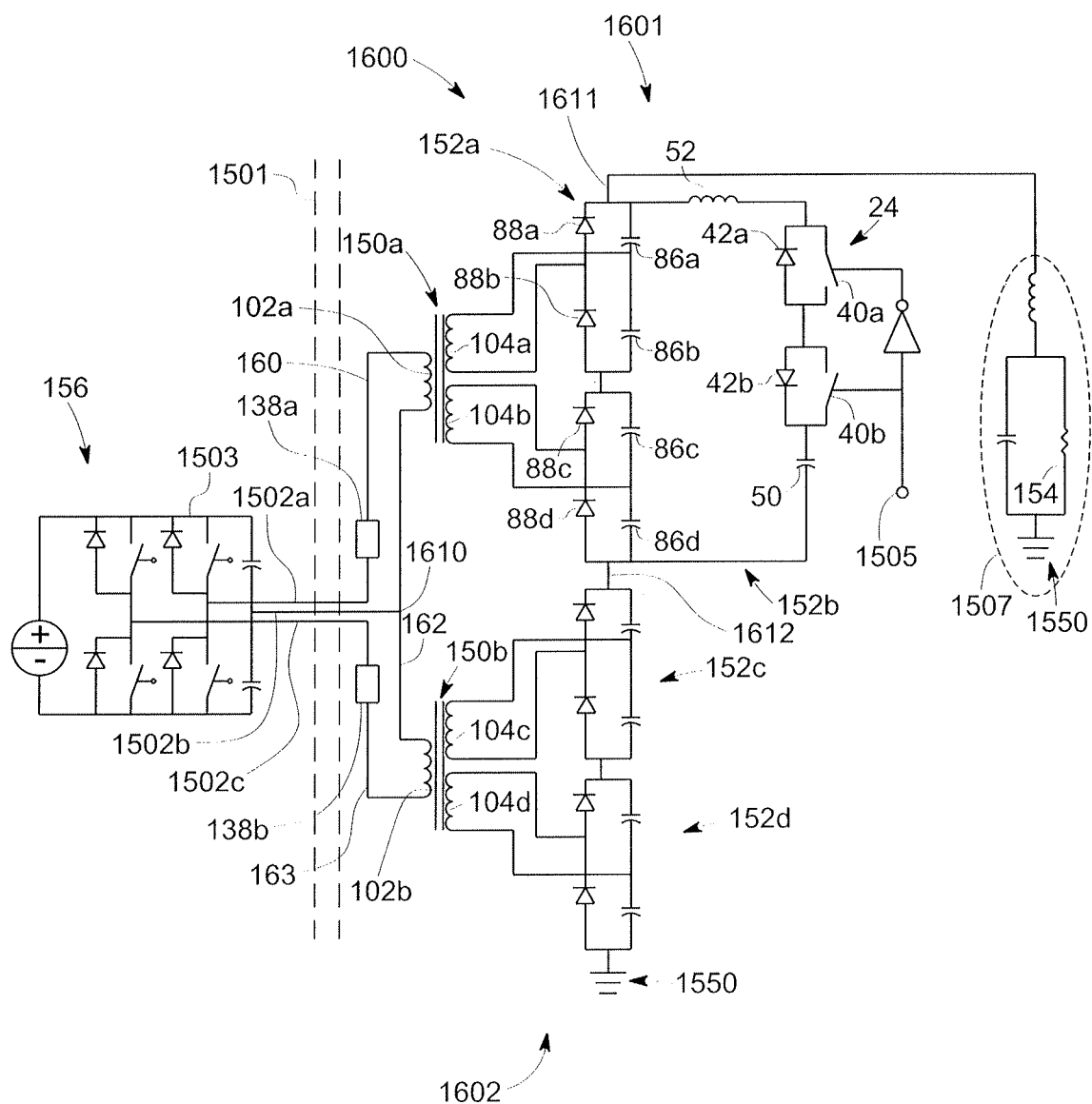
FIG. 15 is a schematic diagram of one example of a three channel configuration of certain systems.

FIG. 15 is a schematic diagram of one example of an DRER circuit 1600 according to an embodiment. In this embodiment, the DRER circuit 1600 receives input power on three wires 1502a, 1502b and 1502c. The schematic shows three main components: an inverter 156, a constant high voltage producing component 1602, and a variable high voltage producing component 1601. It will be noted that there may be any number of high voltage producing components similar to 1601 and 1602 having respective outputs (e.g., outputs 1611, 1612) connected in series; this is referred to as a modular configuration. The inverter 156 delivers power to the high voltage producing components 1601 and 1602 to create and maintain the desired output kV. The output of the inverter 156 is connected to the inputs of the high voltage producing components 1601 and 1602 through three wires 1502a, 1502b, and 1502c. The primary windings 102a and 102b of transformer 150a and 150b, respectively, are the power inputs of the high voltage producing components 1601 and 1602. It will be noted that the inputs windings 102 of the modules 1601 and 1602 have a common terminal 1610 that is connected to the wire 1502b. Because the inverter unit is connected to the kV producing modules through three windings, systems that can be represented as depicted in FIG. 15 are referred to as three channel configuration systems.

The inverter 156 depicted in FIG. 15 has three legs, the legs connected to wire 1502a and 1502c include two switches per leg connected to form what is known as half H-Bridge. The third leg includes two capacitors connected in series with the mid-point connected to wire 1502b. The midpoint is connected to both modules 1601 and 1602 through wire 1502b, the half H-Bridge connected to wire 1502a provides power to module 1601, and the half H-Bridge connected to wire 1502c provides power to module 1602.

In FIG. 15, each module 1601 and 1602 includes a plurality of transformer structures, illustrated as two transformers 150a and 150b. In this example, each transformer includes a primary winding 102a, 102b and two secondary windings 104a, 104b, 104c, 104d per primary winding 102a, 102b. Each of the secondary windings 104a, 104b, 104c, 104d is connected to a voltage doubler 152a, 152b, respectively. Additionally, the secondary windings 104a and 104b of transformer 150a are connected to the resonant switching component 24. In FIGS. 15, 17, 20A and 20B, the resonant switching component 24 includes switches 40a and 40b, diodes 42a and 42b, capacitor 50 and inductor 52. FIG. 15 shows that the structure 1601 is also connected to a load 154 (e.g., a vacuum tube represented using a lumped parameter model of a parallel resistor and capacitor in series with an inductor) and that the load 1507 is connected to ground 1550. It will be noted that structure 1601 is connected between structure 1602 and the load 1507. The sequence is interchangeable: structure 1601 can be connected on the bottom and structure 1602 between structure 1601 and the load 1507.

Each transformer 150a, 150b may have one or more secondary windings 104a, 104b, 104c, 104d each being connected to rectifying circuitry. For example, FIG. 15 includes an example of a module 1601, 1602 with two windings on each secondary side of the transformers 150a and 150b. In some embodiments more than two windings may be present on each secondary side, more than two transformers 150a and 150b may be present and, as mentioned earlier, a plurality of DRER circuits may be used. The rectifying structure may include, for example, a voltage doubler 152a, any kind of voltage multiplier, or a full-bridge rectifier that utilizes four diodes 88a, 88b, 88c, and 88d and four capacitors 86a, 86b, 86c, and 86d.

If a power supply to create dual voltage level is used in a CT context, the power inverter 156 can be located on a stationary surface from the rotating gantry, and the plurality of modules 1601 and 1602 can be located on the rotating side of the gantry. The power inverter 156 is connected to each of the primary windings 102 through the lines 1502a, 1502b and 1502c. The wires 1502a, 1502b and 1502c connect the stationary and rotating side through a slip ring 1501 that will need to have a minimum of three channels. The configuration provides the desired voltage and current to the load 1507, such as an X-ray tube.

The inverter 156 can send power to the modules 1601 and 1602 using different strategies of hard-switching, soft-switching, or resonating power. For the use of the latter two strategies the inverter 156 needs resonant tanks, one to operate the modules for the constant voltage part and an additional one to operate the modules that will pulsate the voltage according the desired pattern. Resonant tanks 138 (e.g., resonant tanks 138a and 138b) facilitate resonant switching and can be placed closer to the high voltage modules and on the rotating side of the gantry (as is depicted in FIG. 15) or on the stationary side. In this example, wire 163 is connected to the transformer having secondary windings 104b not connected to the resonant circuit, and wire 160 is connected to the transformer having secondary windings 104a connected to the resonant circuit. Channel 1502a may be used, with the common channel 1502b, to control the power sent to the transformer 150a in communication with the resonant circuit via wire 160. Channel 1502c may be used, with the common channel 1502b, to control the power sent to the transformer 150b not in communication with the resonant circuit via wire 163.

As discussed above, in some embodiments, there may be any number of high voltage producing components similar to 1601 and 1602 having respective outputs (e.g., outputs 1611, 1612) connected in series; this is referred to as a modular configuration. In one example, there may be seven transformers 150. Each transformer 150 may have 12 secondary windings and each DRER circuit may be connected to six rectifiers (one rectifier per secondary). In this example, each transformer 150 has two DRER circuits. In another example, there may be seven transformers 150. Each transformer 150 may have 12 secondary windings and each DRER circuit may be connected to three rectifiers (one rectifier per secondary). In this example, each transformer 150 has four DRER circuits. It will be understood that, due to the modular configuration, other arrangements are contemplated and the above examples are not intended to be limiting.

Three-Channel Configuration—Operation

Figure 16:
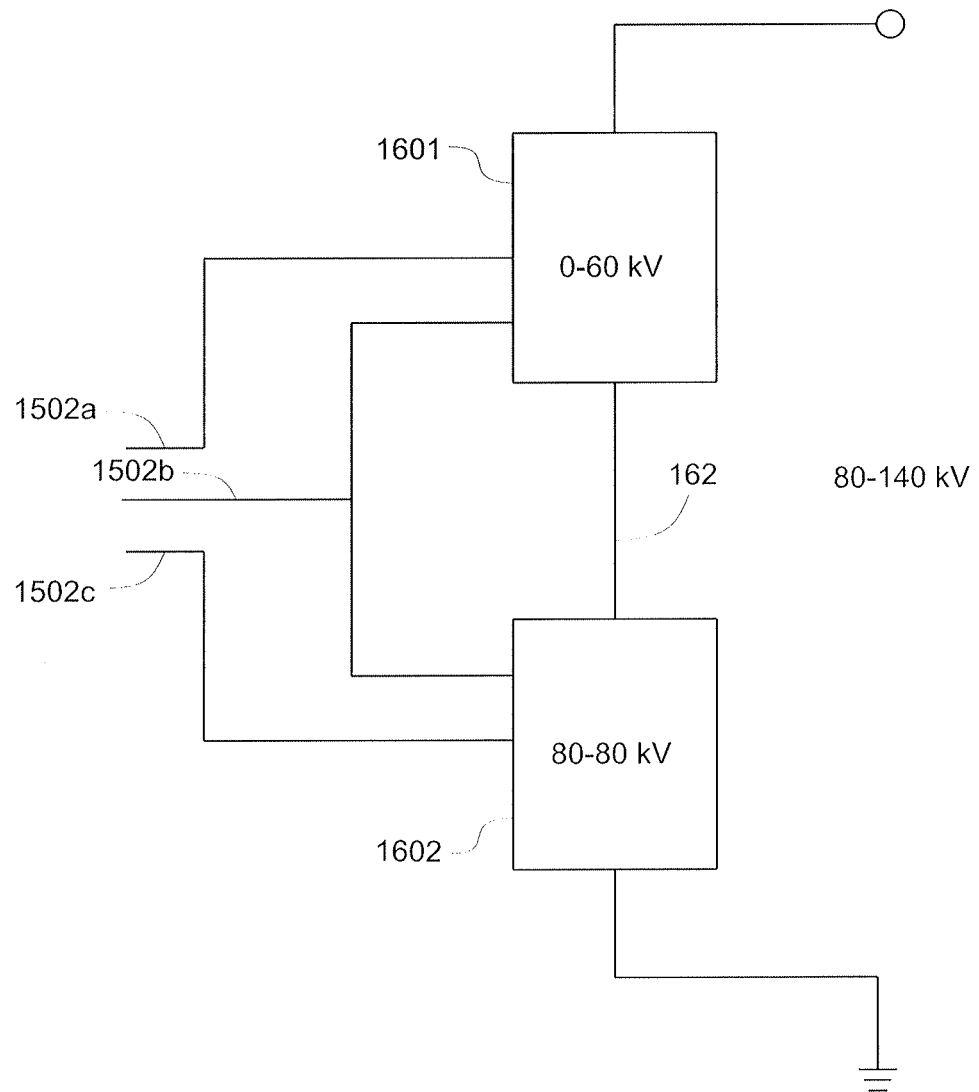
FIG. 16 is a schematic diagram depicting the behavior of the three channel configuration of FIG. 15.

FIG. 16 is a schematic diagram depicting the behavior of the three channel configuration of FIG. 15. Power control channels 1502a, 1502b and 1502c operate the variable high voltage producing component 1601 and the constant high voltage producing component 1602. In this example, the first voltage producing group 1601 includes the transformer 150a and voltage doubler 152a in communication with the resonant switching component 24 of FIG. 15. In this example, the second voltage producing group 1602 includes the transformer 150b and voltage doubler 152c not in communication with the resonant switching component 24 of FIG. 15. For purposes of explanation, FIG. 16 depicts a system operating between a low voltage of 80 kV and a high voltage of 140 kV. In the 80 kV low-voltage configuration the inverter 156 controls the instantaneous voltage between channels 1502b and 1502c, such the totality of the power absorbed by the load is provided through the module 1602 and controls the instantaneous voltage between the channels 1502a and 1502b such that the power sent to the module 1601 is null. As a consequence, the first voltage producing group 1601 outputs 0 kV and the second voltage producing group 1602 outputs 80 kV, resulting in an 80 kV output for the entire configuration.

Similarly, when operating in the high voltage configuration the inverter 156 controls channels 1502b and 1502c to provide fixed voltage (80 kV in the example depicted in FIG. 16) while controls the voltages of between channels 1502a and 1502b to send power to the voltage producing group 1601 so that now the voltage output of this group is 60 kV. As a consequence, the first voltage producing group 1601 outputs 60 kV and the second voltage producing group 1602 outputs 80 kV, resulting in a combined 140 kV output. It will be noted that the instantaneous voltage, therefore the control, between channels 1502b and 1502c when the total load voltage is 80 kV is very different from the instantaneous voltage, therefore the control, when the total load voltage is 140 kV despite the fact that in both cases the high voltage modules 1602 produce 80 kV. It will be noted that each voltage level kV-Low (e.g. 80 kV) or kV-High (e.g. 140 kV) can be maintained constant for as long as needed, and the duty cycle can be regulated as needed.

In this configuration, the channel 1502b is used to allow the inverter 156 to independently control the voltages produced by the modules 1601 and 1602. Most frequently, if not always, slip rings provide two channels for power transmission to the high voltage unit; therefore, the slip ring 1501 in most cases will not permit transmission of a third channel then it will be difficult or impossible to perform the above-described behavior.

Two-Channel Configuration—Configuration

Figure 17:
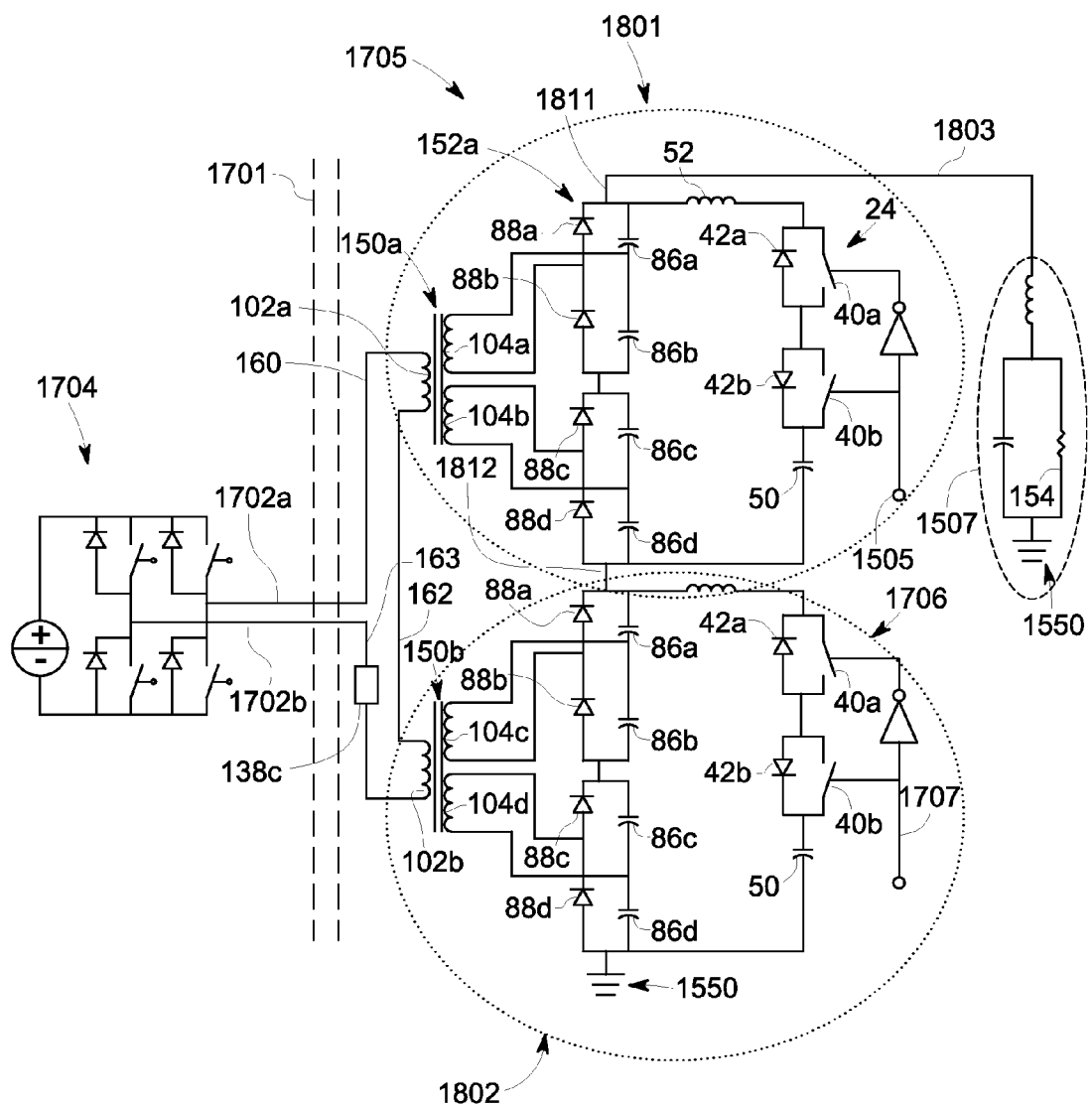
FIG. 17 is a schematic diagram of one example of a two channel configuration of certain embodiments.

FIG. 17 is a schematic diagram of a voltage source that uses a different approach from that described above to allow a fast transition between two voltage levels. In one embodiment, there is one independent power line from the low voltage inverter 1704 and the high voltage side 1705. The power transmission uses two wires 1702a and 1702b instead of three as in the embodiments of FIG. 15. Furthermore, in contrast to the embodiments of FIG. 15 (the three channel configuration), in the embodiments of FIG. 17 there is a single, symmetrical power supply that can vary the input voltage between two different (e.g., two non-zero) voltage levels. This topology will be referred to as two channel configuration of certain embodiments. Here, the slip ring 1701 may permit only two channels 1702a and 1702b to provide energy transfer between power inverter 1704 and gantry circuit 1705. In this embodiment, the power inverter 1704 and gantry circuit 1705 have been modified relative to the three channel configuration to accommodate the reduction in control channels across the slip ring 1701. With regard to the power inverter 1704, a capacitor bank has been removed. With regard to the gantry circuit, another resonant component 1706, similar to resonant switching component 24, has been added along with corresponding control line 1707. These modifications are discussed in greater detail below in relation to FIGS. 19a,b and 20a,b. Due to the different structure, the control that operates the inverter 1704 is also quite different.

Two-Channel Configuration—Operation

Figure 18A:
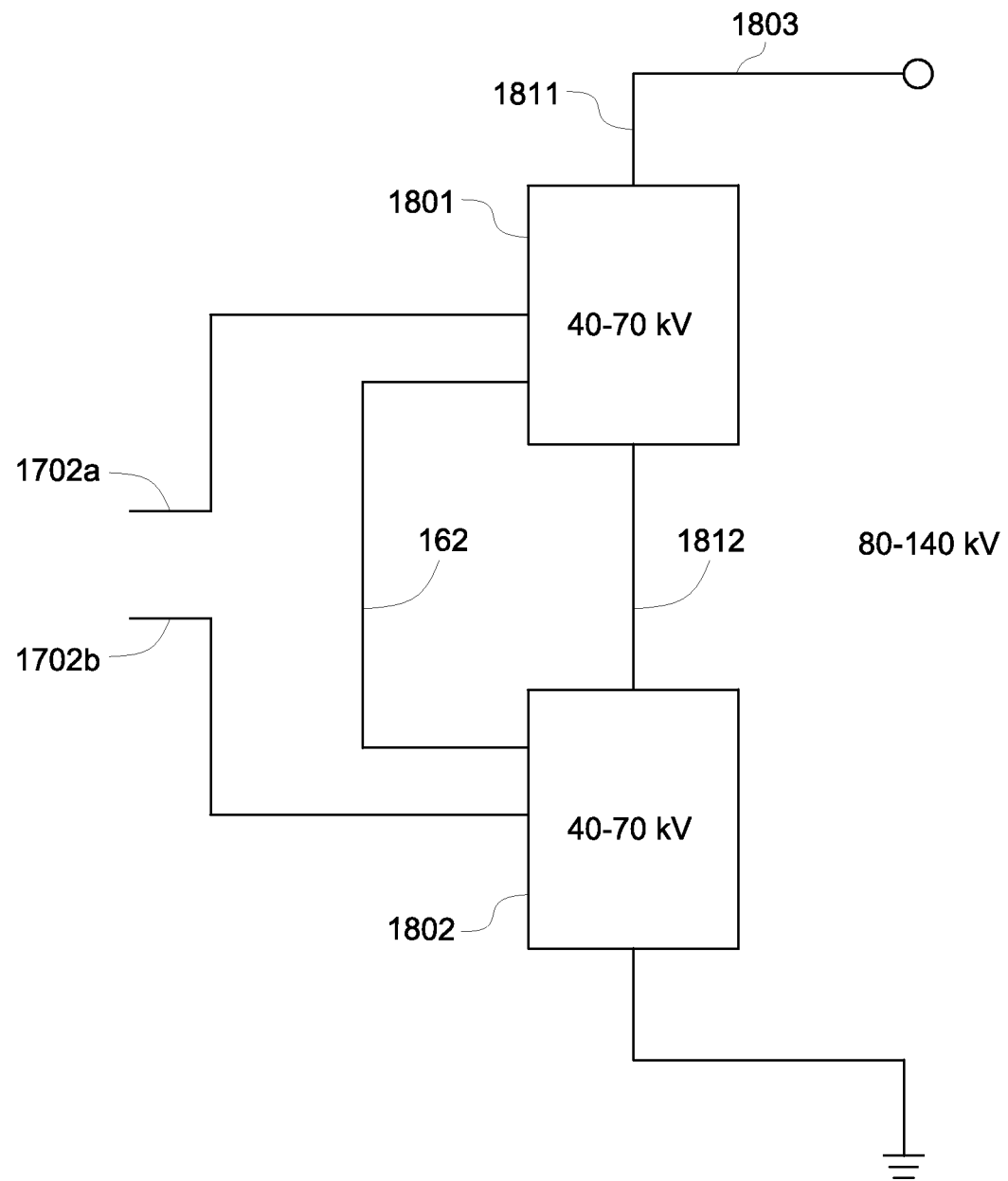
FIGS. 18A-C are schematic diagrams depicting the behavior of the two channel configuration of FIG. 17.

FIG. 18A is a schematic diagram depicting the behavior of the two channel configuration of FIG. 17. Channels 1702a and 1702b operate both a first voltage producing group 1801 and a second voltage producing group 1802 in parallel, such that the power sent through them is evenly shared between 1801 and 1802 and such that both voltage producing groups 1801, 1802 each produce the same output voltage. In this example, the first voltage producing group 1801 includes the transformer 150 and voltage doubler 152 in communication with the resonant switching component 24 of FIG. 17. In this example, the second voltage producing group 1802 includes the transformer 150 and voltage doubler 152 in communication with the resonant switching component 1706 of FIG. 17. An output 1811 of the first voltage producing group 1801 is connected in series with an output 1812 of the second voltage producing group 1802. For purposes of explanation, FIG. 18A depicts a system operating to place a 80 kV and a 140 kV voltage upon load 1507. In contrast to the three channel configuration of FIG. 16, each of the voltage producing groups 1801 and 1802 may be controlled by the power inverter so as to adjust their output voltage symmetrically. In the 80 kV low-voltage configuration each channel control 1702a-b is configured by the power inverter 1704 to cause each of the voltage producing groups 1801 and 1802 to separately output 40 kV. As a consequence, the cumulative voltage at the output 1803 is 80 kV.

Figure 18B:
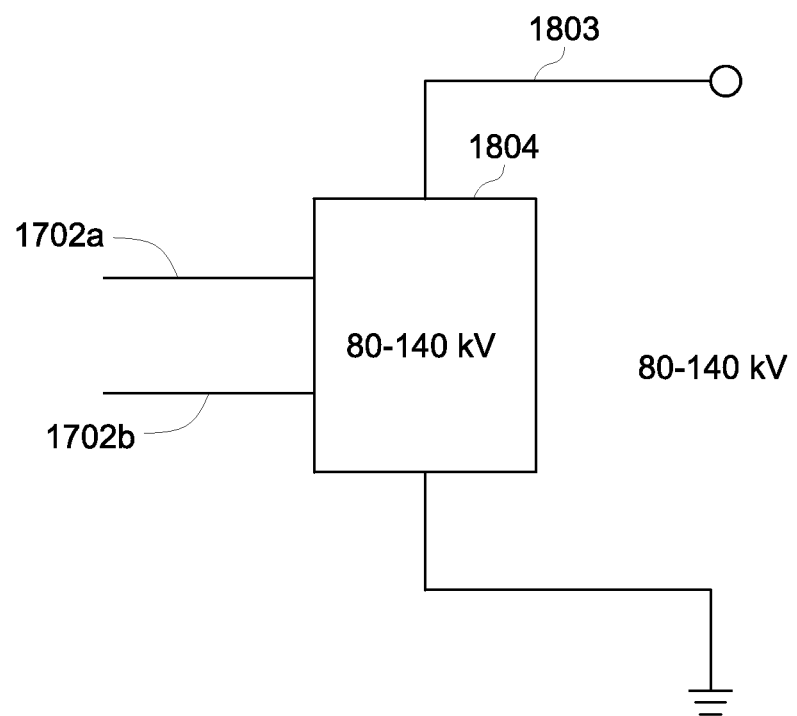
Figure 18C:
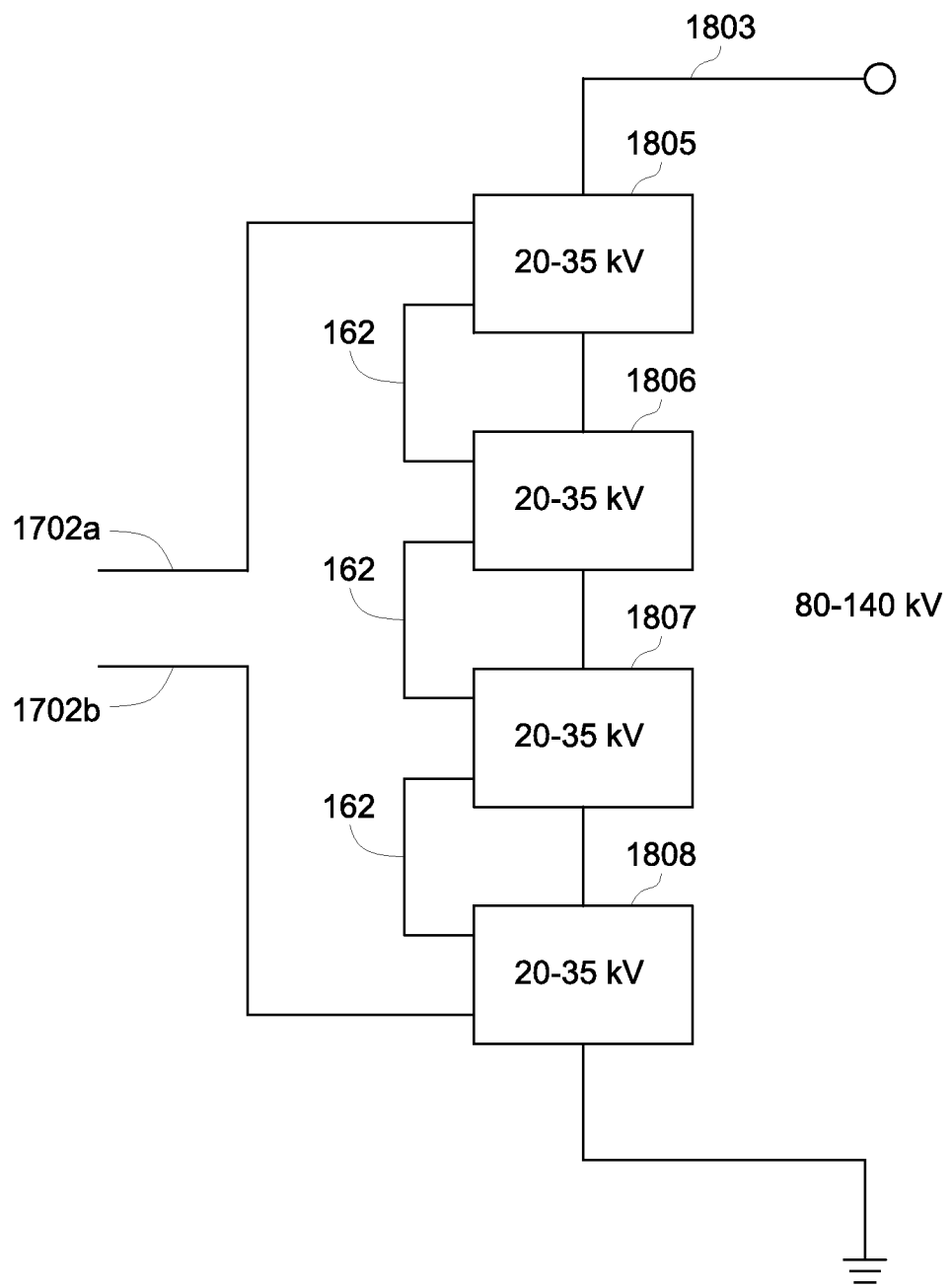

Similarly, when operating in the 140 kV high voltage configuration, the power inverter 1704 adjusts each of the control channels 1702a-b so the first voltage producing group 1801 outputs 70 kV and the second voltage producing group 1802 also outputs 70 kV, resulting in a 140 kV output. It will be understood that any number of voltage producing groups can be used to produce a voltage at output 1803. For example, FIG. 18B depicts a single voltage producing group 1804 configured to output 80 kV and 140 kV voltages at the output 1803. In another example, FIG. 18C depicts four voltage producing groups 1805, 1806, 1807 and 1808 connected in series and configured to output 80 kV and 140 kV voltages at the output 1803. In the 80 kV low-voltage configuration each channel 1702a-b is configured by the power inverter 1704 to cause each of the voltage producing groups 1805, 1806, 1807, and 1808 to separately output 20 kV. Consequently, the cumulative voltage at the output 1803 will be 80 kV. Similarly, when operating in the 140 kV high voltage configuration, the power inverter 1704 adjusts each of the control channels 1702a-b so each of the voltage producing groups 1805, 1806, 1807, and 1808 separately output 35 kV, resulting in a 140 kV total output. In FIG. 18C, the transformer primaries of each voltage producing group 1805, 1806, 1807, 1808 are connected in series via wire 162.

Stationary Circuit Comparison—Three and Two-Channel Configurations

Figure 19A:
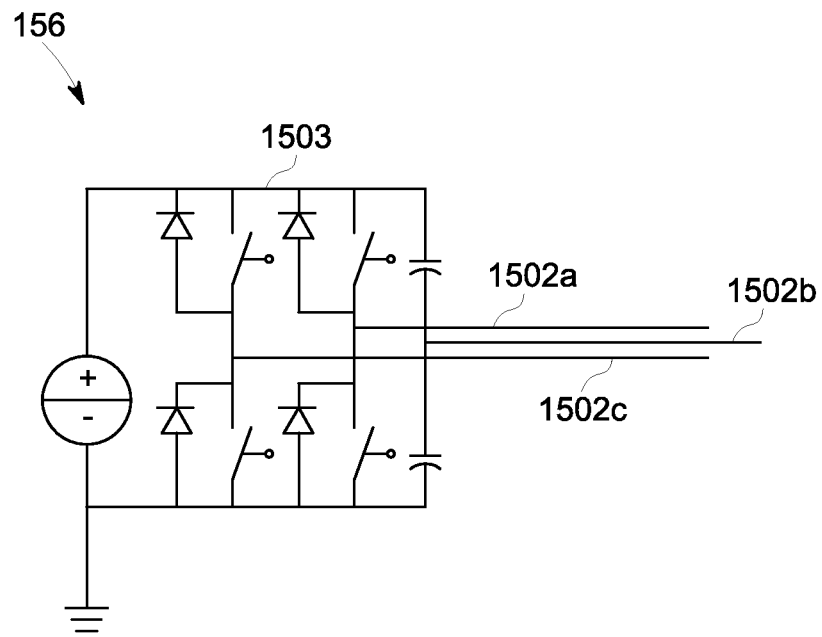
FIG. 19a is a schematic diagram depicting one example of a configuration of one portion of the three-channel configuration of FIG. 15.
Figure 19B:
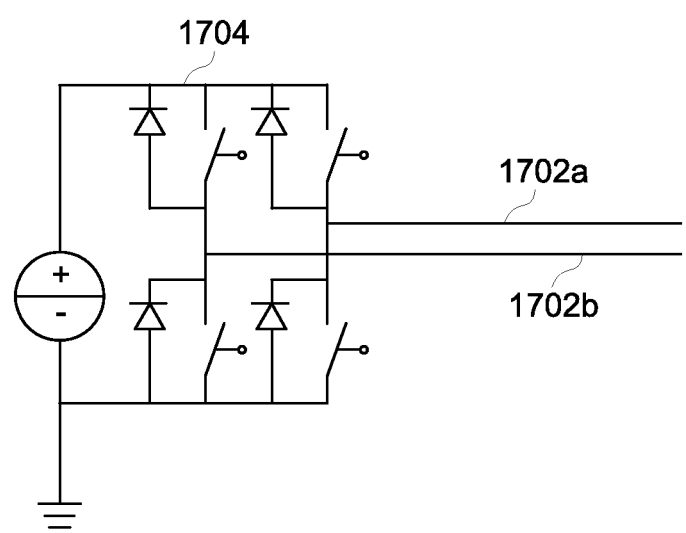
FIG. 19b is a schematic diagram depicting one example of a configuration of one portion of the two-channel configuration of FIG. 17.

FIG. 19a is a schematic diagram depicting the configuration of the stationary portion, in this example a power inverter, of the three-channel configuration of FIG. 15. FIG. 19b is a schematic diagram depicting the configuration of the stationary portion of the two-channel configuration of FIG. 17. In FIG. 19a a capacitor bank 1503 provides a midpoint voltage that effectively allows operating the other two branches as two independent inverters each sending power to a different portion of the high voltage tank (one portion being the constant voltage, the other being the voltage changing from zero to the desired value). The power is sent via 1502a and 1502b for the pulsating voltage and via 1502b and 1502c for the constant voltage. The channel 1502b is shared between the two independent inverters. It will be noted that the structure represented in FIG. 19a can be replaced by two completely independent full H-bridge inverters and produce very similar results. However two H-Bridges will require 4 channels instead of 3. In both cases the control of the two portion is completely independent, one being assigned to keep the voltage constant as the power demand from the load changes, and the other being assigned to pulsating the second half of the high voltage tank to a particular voltage and power delivered to the load. In FIG. 19b, the capacitor bank 1503 and third channel 1502b have been removed and the inverter represented is operated as a full H-bridge inverter. Since the high voltage tank can be operated as one unit (the two halves now are operated symmetrically) this inverter can have one software control. Because it is not necessary to operate two independent inverters, the number of channels can be decreased to two; channel 1602a and channel 1602b one per half H-Bridge branch. This approach is more suitable for Gantry operation, where, in most cases, there are only two power channels available.

Gantry Circuit Comparison—Three and Two-Channel Configurations

Figure 20A:
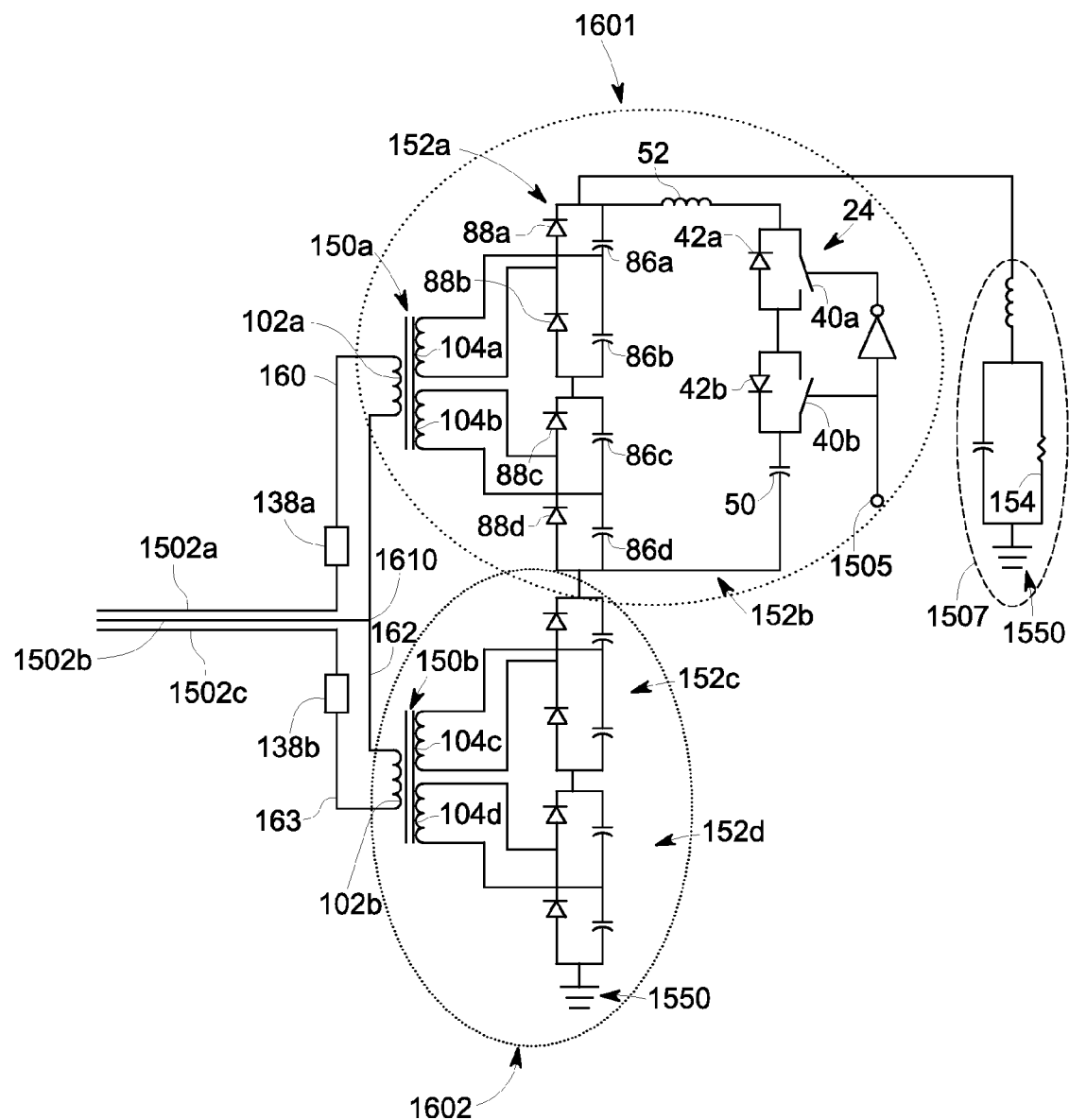
FIG. 20a is a schematic diagram depicting the configuration of another portion of the three-channel configuration of FIG. 15.
Figure 20B:
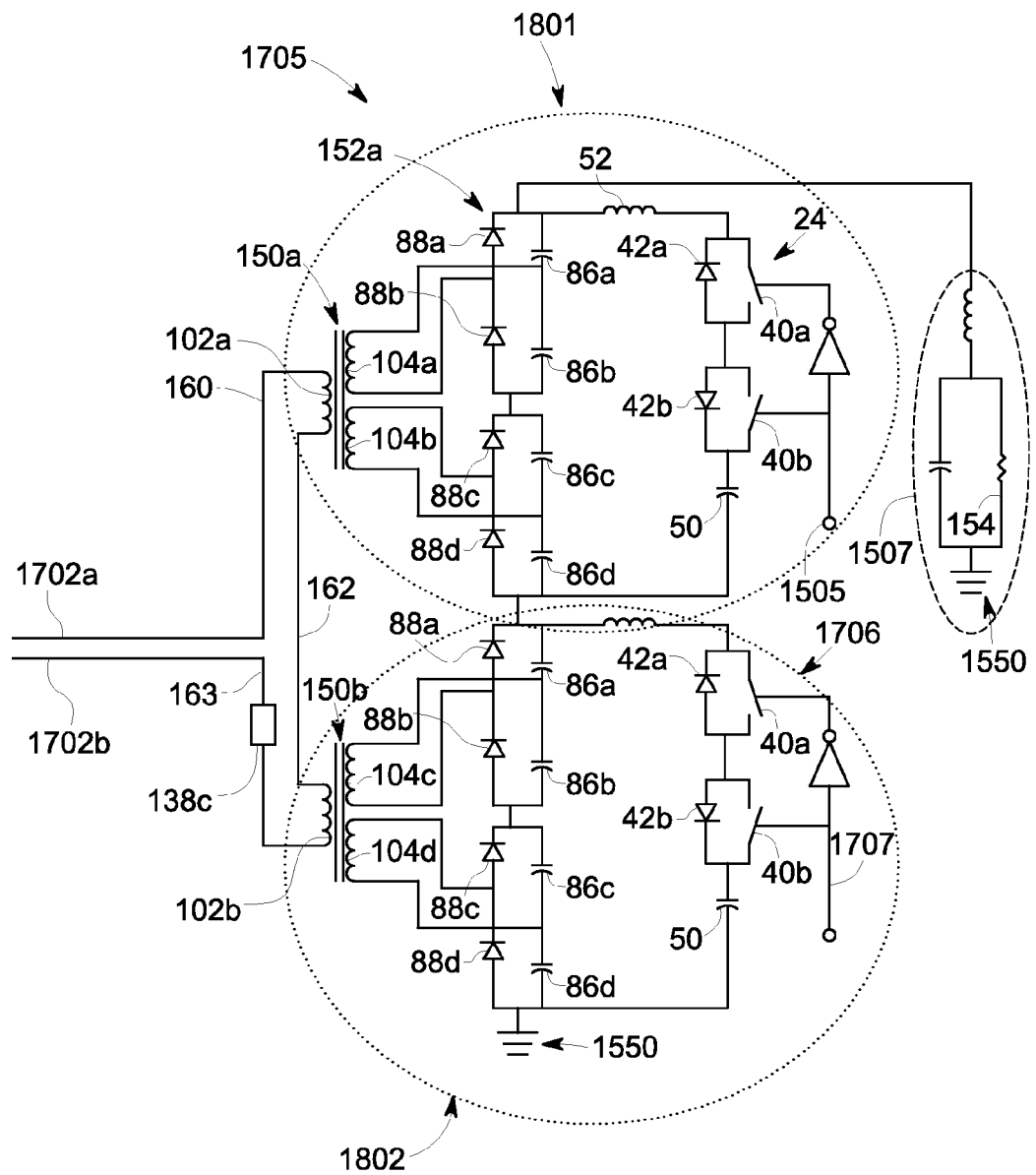
FIG. 20b is a schematic diagram depicting the configuration of another portion of the two-channel configuration of FIG. 17.

FIG. 20a is a schematic diagram depicting the configuration of the gantry portion of the three-channel configuration of FIG. 15. FIG. 20b is a schematic diagram depicting the configuration of the gantry portion of the two-channel configuration of FIG. 17. In the three channels configuration, if the stationary part is operated as two independent resonant inverters (either hypo-resonant or hyper-resonant), there can be two resonant tank components; in FIG. 20A these component are indicated as 138a and 138b. In the two channels configuration shown in FIG. 20b, since the inverter is operated as one, the high voltage tank uses one resonant component indicated as 138. The two channel configuration, being operated as one high voltage tank, presents full hardware symmetry, therefore it includes as many energy transferring resonant circuitries 1706 as the units included in the high voltage tank. FIG. 20b shows only two of these circuitries: both indicated as 1706; but there can be any number of such circuits. Both the control line 1505 of the first resonant component and the control line 1707 of the second resonant component may be controlled by the same control signal.

Figure 21:
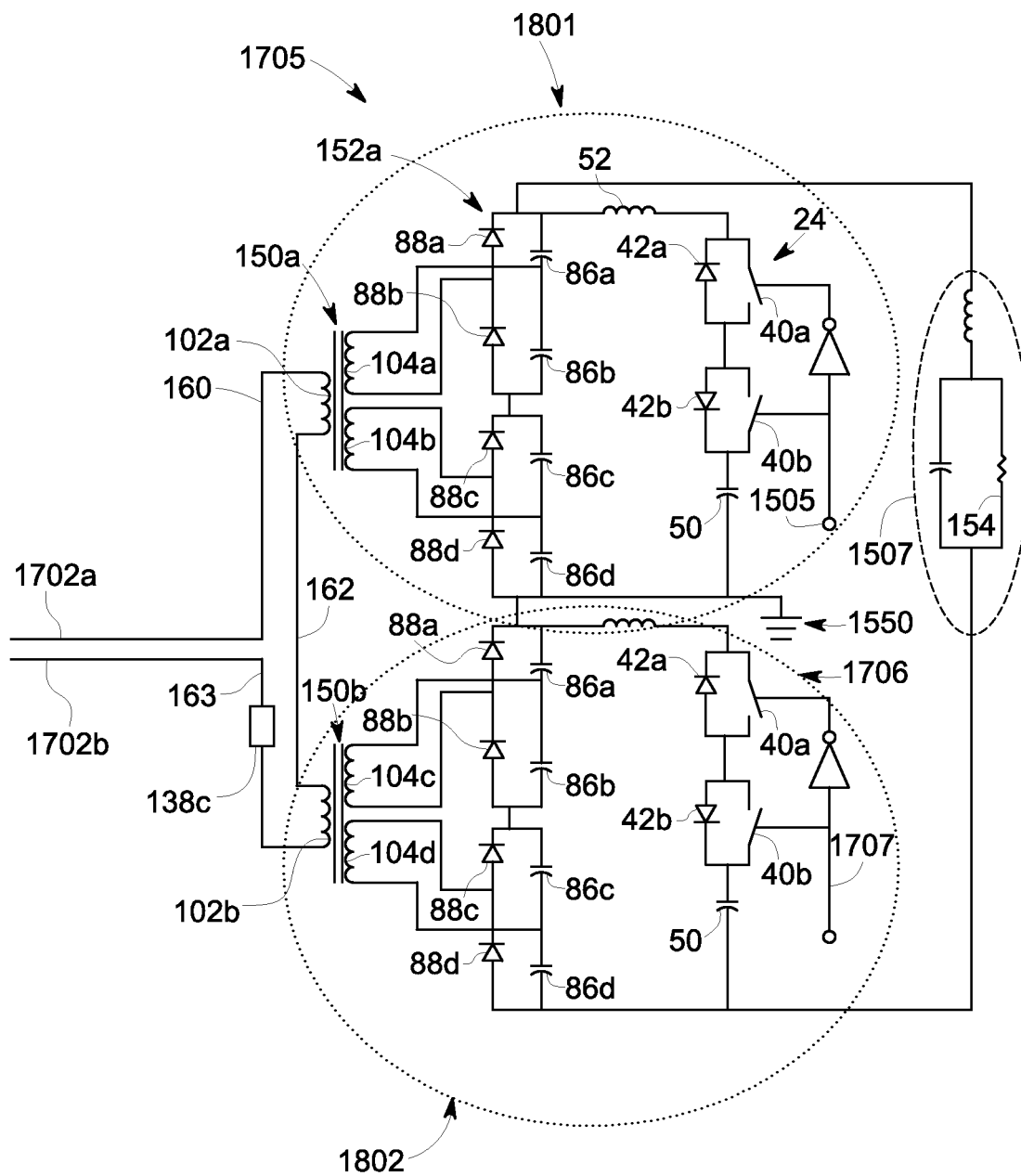
FIG. 21 is a schematic diagram depicting the configuration of a portion of a two-channel configuration.

FIG. 21 shows alternate embodiment of a gantry portion of a two-channel configuration described with respect to FIGS. 17 and 20b. The configuration shown in FIG. 21 has a similar configuration to that of the gantry portion shown in FIG. 20 except that the ground connection 1550 has been relocated. The load 1507 (e.g., a vacuum tube) can be connected directly between the most positive terminal 1803 in the stack and the most negative terminal in the stack 2100 as shown in FIG. 21, and the ground connection 1550 can be placed such that the voltage between the terminals and ground can be as small as possible (e.g., if the load needs 140 kV, the ground connection 1550 can be placed such that the positive terminal will be at 70 KV and the negative terminal will be at negative 70 kV). While FIGS. 15, 17, 20a, 20b, and 21 depict the ground connection 1550 at one or more locations in the schematic diagram, those skilled I the art will recognize that the ground connection 1550 can be placed a different locations in the circuit (e.g., to achieve a desired terminal-to-ground voltage.

Remarks

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts, circuits, and schematics are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts. Likewise, one skilled in the art will recognize the modularity of the method proposed therefore the exemplary embodiments are not limited to any particular number of modules as depicted in drawings included in this disclosure.

What is claimed is:
1. A voltage switching system comprising:
   a two-channel inverter configured to receive a non-zero variable input voltage from a voltage source;
   a first input channel and a second input channel each electrically coupled to the two-channel inverter;

a transformer having a primary winding in electrical communication with the first input channel and the second input channel, and a plurality of secondary windings; and an active resonant circuit in electrical communication with the secondary windings of the transformer and configured to generate a switching output voltage at each of two different voltage levels, each of the two different voltage levels being different than the non-zero variable input voltage, the active resonant circuit comprising:

a plurality of switching devices arranged in an anti-parallel configuration;

a capacitor electrically coupled in series with the plurality of switching devices and configured to receive and store energy during a first portion of a resonance cycle and further configured to discharge the energy during a second portion of the resonance cycle;

an inductor electrically coupled in series with the capacitor and the plurality of switching devices and configured to transfer the energy to and from the capacitor during the resonance cycle; and an output configured to be electrically coupled to a load.

2. The voltage switching system of claim 1, wherein the plurality of switching devices are configured to recirculate the energy stored in the capacitor via the inductor during a subsequent resonance cycle.

3. The voltage switching system of claim 2, wherein the active resonant circuit is further configured to generate one of the two different voltage levels during the first portion of the resonance cycle and another one of the two different voltage levels during the second portion of the resonance cycle.

4. The voltage switching system of claim 1, further comprising a resonant tank electrically interposed between the primary winding of the transformer and one of the first input channel and the second input channel.

5. The voltage switching system of claim 1, further comprising a slip-ring electrically interposed between the transformer and the two-channel inverter.

6. The voltage switching system of claim 1, further comprising a rectifier electrically interposed between the secondary windings of the transformer and the active resonant circuit.

7. The voltage switching system of claim 1, wherein:
the transformer is a first transformer;
the active resonant circuit is a first active resonant circuit; and
the system further comprises:
a second transformer having a primary winding electrically interposed between the primary winding of the first transformer and one of the first input channel and the second input channel, and a plurality of secondary windings; and
a second active resonant circuit in electrical communication with the secondary windings of the second transformer and configured to generate a second switching output voltage at each of the two different voltage levels, the second active resonant circuit comprising:
a second plurality of switching devices arranged in the anti-parallel configuration;
a second capacitor electrically coupled in series with the second plurality of switching devices and configured to receive and store a second energy during the first portion of the resonance cycle and further configured to discharge the second energy during the second portion of the resonance cycle;
a second inductor electrically coupled in series with the second capacitor and the second plurality of switching devices and configured to transfer the second energy to and from the second capacitor during the resonance cycle; and
a second output electrically coupled in series with the output of the first active resonant circuit.

8. The voltage switching system of claim 7, wherein the first transformer and the second transformer are in electrical communication with the two-channel inverter via at most two channels.

9. The voltage switching system of claim 1, further comprising an x-ray tube connected to the output of the active resonant circuit and configured to provide two different energy spectra when powered by the two different voltage levels.

10. A method of voltage switching comprising:
receiving a non-zero variable input voltage from a voltage source;
electrically communicating the non-zero variable input voltage to a primary winding of a transformer via a first input channel and a second input channel;
switching a plurality of switching devices arranged in an anti-parallel configuration and coupled to a plurality of secondary windings of the transformer to generate a switching output voltage at each of two different voltage levels, each of the two different voltage levels being different than the non-zero variable input voltage;
during a first portion of a resonance cycle, receiving and storing energy in a capacitor electrically coupled in series with the plurality of switching devices;
during a second portion of the resonance cycle, discharging the energy stored in the capacitor;
during the resonance cycle, transferring the energy to and from the capacitor via an inductor electrically coupled in series with the capacitor and the plurality of switching devices; and
outputting the switching output voltage to a load.

11. The method of claim 10, further comprising recirculating the energy stored in the capacitor via the inductor during a subsequent resonance cycle using the plurality of switching devices.

12. The method of claim 11, further comprising generating one of the two different voltage levels during the first portion of the resonance cycle and generating another one of the two different voltage levels during the second portion of the resonance cycle.

13. The method of claim 10, further comprising electrically communicating the non-zero variable input voltage via a resonant tank interposed between the primary winding of the transformer and one of the first input channel and the second input channel.

14. The method of claim 10, further comprising electrically communicating the non-zero variable input voltage via a slip-ring electrically interposed between the transformer and the two-channel inverter.

15. The method of claim 10, further comprising electrically communicating a high voltage via a rectifier interposed between the secondary windings of the transformer and the active resonant circuit.

16. The method of claim 10, wherein:
the transformer is a first transformer;
the active resonant circuit is a first active resonant circuit; and the method further comprises:
electrically communicating the non-zero variable input voltage to a primary winding of a second transformer via the first input channel and the second input channel, the second transformer having a primary winding interposed between the primary winding of the first transformer and one of the first input channel and the second input channel;
switching a second plurality of switching devices arranged in an anti-parallel configuration and coupled to a plurality of secondary windings of the second transformer to generate a switching output voltage at each of the two different voltage levels;
during the first portion of a resonance cycle, receiving and storing a second energy in a second capacitor electrically coupled in series with the second plurality of switching devices;
during the second portion of the resonance cycle, discharging the second energy stored in the second capacitor; and
during the resonance cycle, transferring the second energy to and from the second capacitor via a second inductor electrically coupled in series with the second capacitor and the second plurality of switching devices.

17. The method of claim 16, further comprising, during a period of non-resonance, maintaining the second energy in the second capacitor.

18. The method of claim 16, wherein the first transformer and the second transformer are in electrical communication with the two-channel inverter via at most two channels.

19. The method of claim 10, further comprising electrically communicating the two different voltage levels to an x-ray tube connected to the output of the active resonant circuit and configured to provide two different energy spectra when powered by the two different voltage levels.

* * * * *